(12) United States Patent
Tack et al.

(10) Patent No.: US 12,406,342 B2
(45) Date of Patent: Sep. 2, 2025

(54) SYSTEMS AND METHODS FOR PERFORMING INPAINTING

(71) Applicant: Canva Pty Ltd, Surry Hills (AU)

(72) Inventors: Alexander Tack, Vienna (AT); Stefan Sietzen, Salzburg (AT); David Fankhauser, Vienna (AT)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 18/757,484

(22) Filed: Jun. 27, 2024

(65) Prior Publication Data

US 2024/0404027 A1 Dec. 5, 2024

(30) Foreign Application Priority Data

Jun. 5, 2023 (AU) .................................. 2023901771
Jun. 27, 2023 (AU) .................................. 2023204097

(51) Int. Cl.
*G06T 5/77* (2024.01)
*G06T 7/194* (2017.01)

(52) U.S. Cl.
CPC ................ *G06T 5/77* (2024.01); *G06T 7/194* (2017.01)

(58) Field of Classification Search
CPC ... G06T 5/77; G06T 7/194; G06T 7/11; G06T 2207/20081; G06T 2207/20084; G06T 5/50; G06T 2207/10024; G06T 5/70; G06T 2207/20221; G06T 11/60; G06T 7/136; G06T 5/60; G06T 7/13; G06T 7/12; G06T 2207/10004; G06T 5/30; G06T 2207/20021; G06T 7/174; G06T 5/00; G06T 2207/20224; G06T 7/187; G06T 7/10; G06N 3/045; G06N 3/08;
(Continued)

(56) References Cited

U.S. PATENT DOCUMENTS

2020/0175654 A1* 6/2020 Tagra ........................ G06T 5/50
2020/0327675 A1* 10/2020 Lin ............................ G06T 5/77
(Continued)

FOREIGN PATENT DOCUMENTS

WO 2022220832 A1 10/2022
WO WO-2024075162 A1 * 4/2024

OTHER PUBLICATIONS

Examination Report No. 1 for Australian patent application No. 2023204097 mailed Aug. 22, 2023 (pp. 1-6).
(Continued)

*Primary Examiner* — Henok Shiferaw
*Assistant Examiner* — Woo C Rhim
(74) *Attorney, Agent, or Firm* — GrowIP Law Group LLC

(57) ABSTRACT

Described embodiments generally relate to a computer-implemented method for performing inpainting. The method includes accessing a first image; receiving a selected area of the first image; identifying a foreground area of the first image; generating a merged mask based on the union of the user selected area and the foreground area; performing an inpainting process on the area of the first image corresponding to the merged mask to generate a second image, being an inpainted image; generating a reduced mask based on the user selected area reduced by the foreground area; and combining the first image with the area of the second image corresponding to the reduced mask to produce an output image.

20 Claims, 14 Drawing Sheets

(58) Field of Classification Search
CPC ........ G06N 20/00; G06N 3/02; G06N 3/0464; G06V 10/82; H04N 5/272; H04N 1/3872
See application file for complete search history.

(56) References Cited

U.S. PATENT DOCUMENTS

| | | | |
|---|---|---|---|
| 2021/0125313 A1* | 4/2021 | Bai | G06V 10/806 |
| 2021/0150751 A1 | 5/2021 | Liu et al. | |
| 2021/0342983 A1* | 11/2021 | Lin | G06N 3/088 |
| 2021/0383242 A1* | 12/2021 | Ostyakov | G06T 7/11 |
| 2021/0398288 A1* | 12/2021 | Bhattacharya | G06T 7/12 |
| 2022/0058777 A1* | 2/2022 | Cohen | G06V 40/10 |
| 2022/0156893 A1* | 5/2022 | Zhou | G06T 5/50 |
| 2022/0237750 A1* | 7/2022 | Pan | G11B 27/036 |
| 2022/0237799 A1* | 7/2022 | Price | G06T 7/174 |
| 2022/0301117 A1* | 9/2022 | Li | G06T 5/77 |
| 2022/0301118 A1* | 9/2022 | Frey | G06T 5/77 |
| 2023/0217097 A1* | 7/2023 | Wu | H04N 23/951 348/208.1 |
| 2023/0259587 A1* | 8/2023 | Lin | G06T 5/60 |
| 2023/0274399 A1* | 8/2023 | Hsiao | G06T 5/77 382/190 |
| 2023/0342890 A1* | 10/2023 | Kanazawa | G06T 5/77 |
| 2023/0353701 A1* | 11/2023 | Shukla | H04N 23/617 |
| 2024/0046429 A1* | 2/2024 | Amirghodsi | G06T 7/11 |
| 2024/0062345 A1* | 2/2024 | Kulshreshtha | G06T 5/77 |
| 2024/0169501 A1* | 5/2024 | Liu | G06T 5/70 |

OTHER PUBLICATIONS

Din, N., et al., "Effective Removal of User-Selected Foreground Object From Facial Images Using a Novel GAN-Based Network", IEEE Access, IEEE, USA, vol. 8, Jun. 11, 2020, pp. 109648-109661.

European Search Report for application No. EP24186237 mailed Nov. 12, 2024, pp. 1-8.

Granados, M., et al., "How Not to Be Seen—Object Removal from Videos of Crowded Scenes", EUROGRAPHICS, vol. 31, 2012, pp. 1-10.

* cited by examiner

Fig. 7A
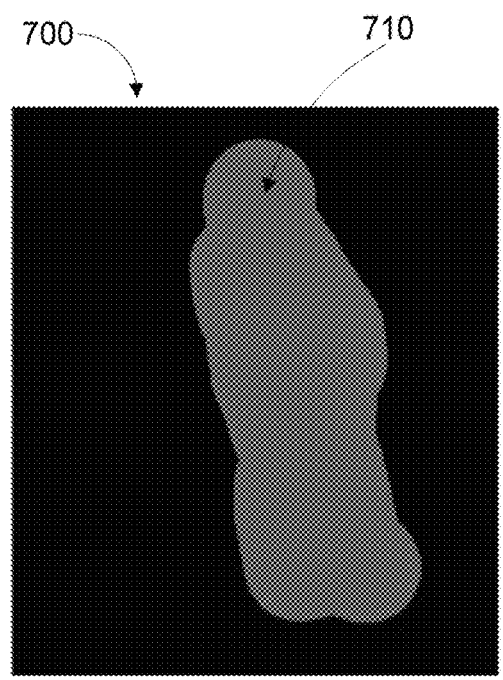
Fig. 7B
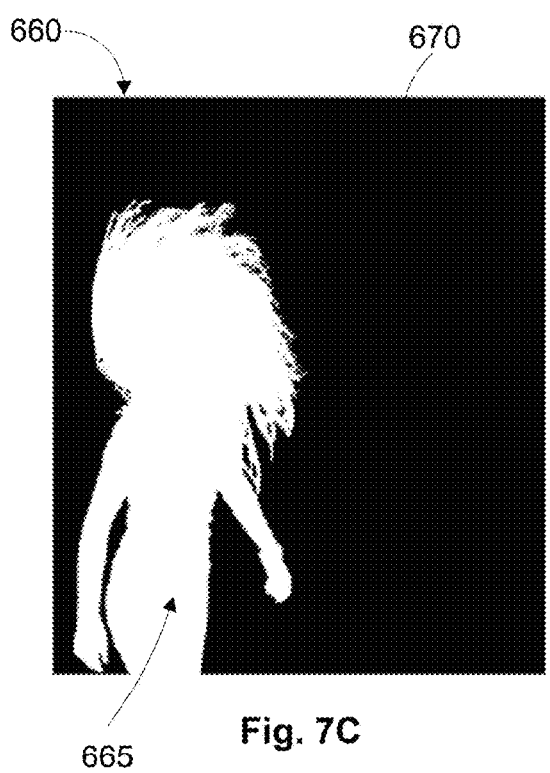
Fig. 7C
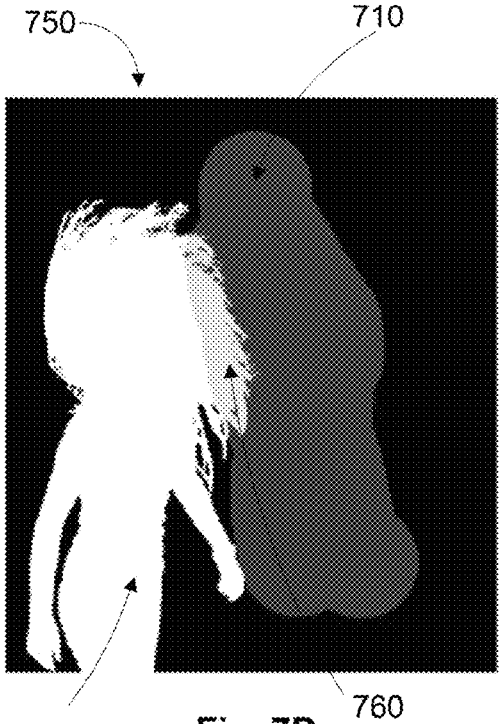
Fig. 7D
Fig. 8

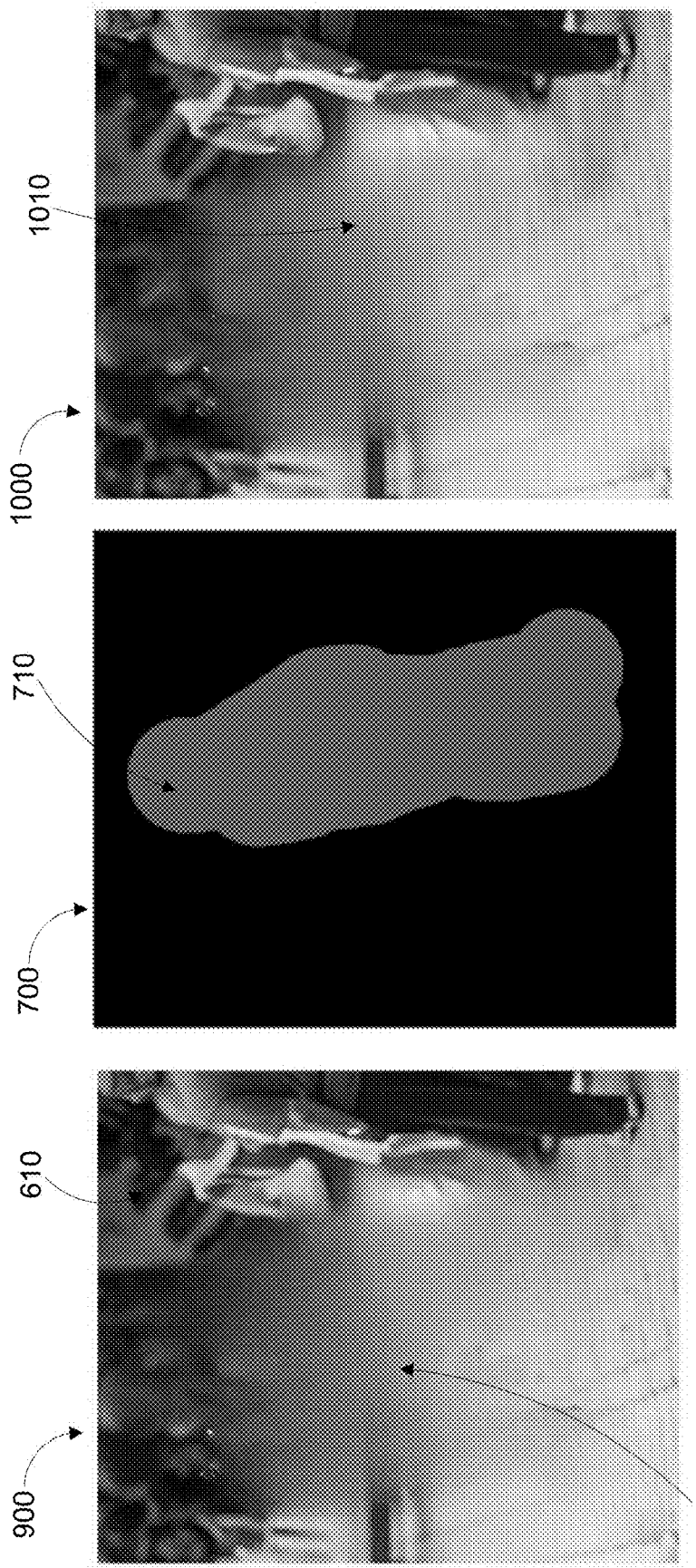

SYSTEMS AND METHODS FOR PERFORMING INPAINTING

CROSS-REFERENCE TO RELATED APPLICATIONS

This application is a U.S. Non-Provisional Application that claims priority to and the benefit of Australian Patent Application No. 2023204097, filed Jun. 27, 2023, that in turn claims priority to Australian Provisional Patent Application No. 2023901771, filed Jun. 5, 2023, that are hereby incorporated by reference in their entirety.

TECHNICAL FIELD

Described embodiments relate to systems and methods for performing inpainting. In particular, described embodiments relate to systems and methods for performing inpainting of digital images.

BACKGROUND

Inpainting is a term used to describe an image processing technique for removing unwanted image elements, and replacing these with new elements in a way that preserves the realism of the original image. Historically, inpainting was performed manually to physical images by painting or otherwise covering unwanted image elements with a physical medium. As digital image processing tools became widely adopted, digital inpainting became possible.

Digital inpainting can be performed manually using digital image editing software to fill in areas of an image. This can be extremely long and tedious work if a quality result is desired, especially when working with large areas. This is because this method of inpainting can require a pixel-level manipulation of the image to replace the unwanted area with a realistic fill. Some automated approaches have been developed, but these often produce an unrealistic result and undesirably distort the image.

It is desired to address or ameliorate one or more shortcomings or disadvantages associated with prior systems and methods for performing inpainting, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a computer-implemented method for performing inpainting, the method comprising:
accessing a first image;
receiving a selected area of the first image;
identifying a foreground area of the first image;
generating a merged mask based on the union of the user selected area and the foreground area;
performing an inpainting process on the area of the first image corresponding to the merged mask to generate a second image, being an inpainted image;
generating a reduced mask based on the user selected area reduced by the foreground area; and
combining the first image with the area of the second image corresponding to the reduced mask to produce an output image.

Some embodiments further comprise storing the output image to a memory location.

Some embodiments further comprise communicating the output image to an external device.

Some embodiments further comprise:
computing a relative mask overlap between the user selected area and the foreground area;
comparing the relative mask overlap with at least one threshold; and
proceeding with the steps of generating a merged mask, performing an inpainting process, generating a reduced mask and combining images based on the results of the comparison, wherein these steps form part of a foreground protection process.

According to some embodiments, the relative mask overlap is calculated using the equation:

$$RMO = \frac{\text{Num\_pixels}(US\_area \cap FG\_area)}{\text{Num\_pixels}(US\_area)}$$

where RMO is the relative mask overlap, Num_pixels is a function to find a number of pixels, US_area is the user selected area and FG_area is the foreground area.

According to some embodiments, comparing the relative mask overlap with at least one threshold comprises comparing the relative mask overlap with a lower threshold, and performing the foreground protection process based on determining that the relative mask overlap is greater than the lower threshold.

In some embodiments, the lower threshold is 0%.

In some embodiments, based on determining that the relative mask overlap is less than or equal to the lower threshold, instead of performing the foreground protection algorithm, performing an inpainting process on the area of the first image corresponding to the user selected area to generate the output image.

According to some embodiments, comparing the relative mask overlap with at least one threshold comprises comparing the relative mask overlap with an upper threshold, and performing the foreground protection process based on determining that the relative mask overlap is less than the upper threshold.

In some embodiments, the upper threshold is between 10% and 90%.

In some embodiments, the upper threshold is between 40% and 70%.

In some embodiments, the upper threshold is 50%.

According to some embodiments, based on determining that the relative mask overlap is more than or equal to the upper threshold, instead of performing the foreground protection process, performing an inpainting process on the area of the first image corresponding to the user selected area to generate the output image.

Some embodiments further comprise the step of dilating the merged mask, and performing the inpainting process on the area of the first image corresponding to the dilated merged mask.

In some embodiments, the merged mask is dilated by between 1 and 9 pixels.

In some embodiments, the merged mask is dilated by between 3 and 7 pixels.

In some embodiments, the merged mask is dilated by 5 pixels.

Some embodiments further comprise performing a second inpainting process on the area of the first image corresponding to the user selected area to generate the second image.

Some embodiments further comprise performing a smoothing process on the output image before outputting the image, to smooth the edge between the first image and the second image.

According to some embodiments, the smoothing is performed using an alpha compositing process.

In some embodiments, performing the inpainting process comprises performing an AI based inpainting process.

According to some embodiments, performing the inpainting process comprises performing a LaMa inpainting process.

In some embodiments, identifying a foreground area of the first image comprises performing a background removal process on the first image.

Some embodiments relate to a non-transitory computer-readable storage medium storing instructions which, when executed by a processing device, cause the processing device to perform the method of some other described embodiments.

Some embodiments relate to a computing device comprising:

the non-transitory computer-readable storage medium of some other described embodiments; and a processor configured to execute the instructions stored in the non-transitory computer-readable storage medium.

BRIEF DESCRIPTION OF DRAWINGS

Various ones of the appended drawings merely illustrate example embodiments of the present disclosure and cannot be considered as limiting its scope.

FIGS. 7A to 7D show a series of example images showing the results of performing a relative mask overlap calculation step according to some embodiments;

FIGS. 10A to 10C show a series of example images showing the results of performing a user selected area inpainting step according to some embodiments;

DESCRIPTION OF EMBODIMENTS

Described embodiments relate to systems and methods for performing inpainting. In particular, described embodiments relate to systems and methods for performing inpainting of digital images.

Image inpainting refers to removing an area of an image, such as an undesirable image element, and filling the removed area such that the image looks realistic and as if the undesirable image element had never been there. Automated digital techniques have been developed that allow users to select one or more areas of an image for removal, and which will automatically fill the selected areas in a way that replaces the area with a realistic alternative. However, these techniques often distort surrounding image areas, especially when the area selected for removal overlaps with a foreground element of the image.

FIGS. 1A to 1C and 2A to 2C show examples of the distortion that can occur using existing techniques.

Figure 1A:
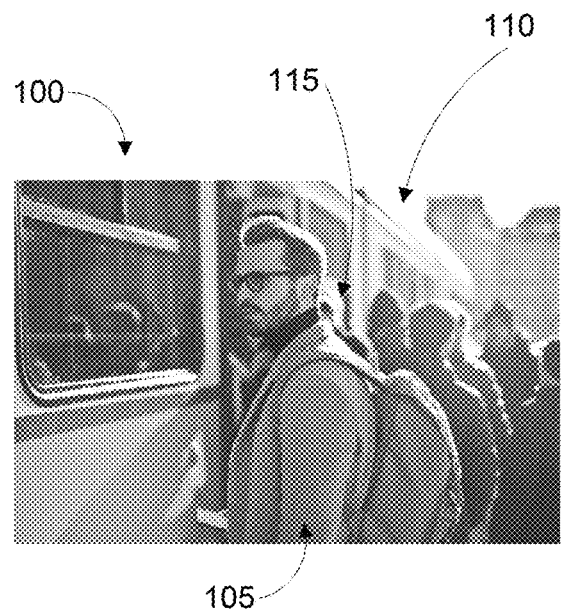
FIGS. 1A to 1D show a first series of example images that show the results of inpainting using prior known techniques compared to methods of some embodiments described below.

FIG. 1A shows an example image 100 having a foreground image element 105 and a background image element 110. In the illustrated example, foreground image element 105 comprises a person located close to the camera capturing the image and being the main subjects of the image, while background image element 110 comprises a train, people and cityscape located behind the person, serving as a backdrop. Image 100 also comprises an unwanted image element 115, being a person who is not an intended subject of the image, but who has been partially captured in the image behind the subject of the image. The unwanted image element 115 is directly adjacent to and in contact with the edge of part of the foreground image element 105.

Figure 1B:
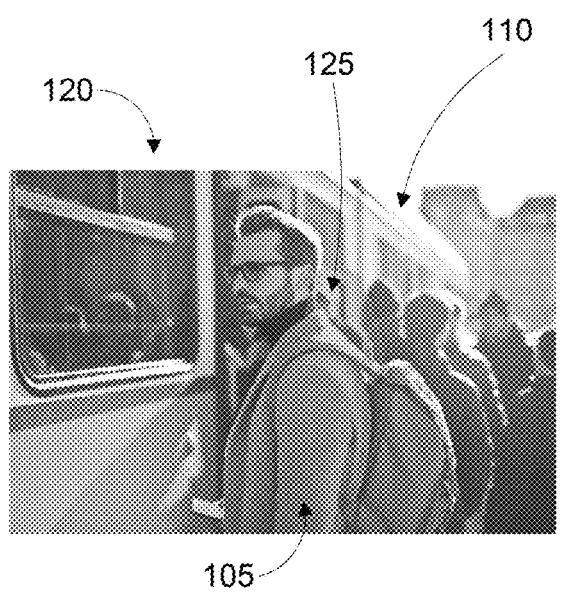

FIG. 1B shows an image 120. Image 120 has the same foreground image element 105 and background image element 110 as image 100. The difference between image 100 and image 120 is that image 120 includes a user selected area 125 applied over unwanted image element 115. According to some embodiments, a user wishing to edit image 100 may interact with a user interface component of a computing device displaying image 100 to indicate which area of image 100 they consider to be an unwanted image element, and wish to remove from the image. For example, the user may use a brush tool, trace tool, or other tool to digitally select, trace, circle, or "paint" over the unwanted image element via the user interface to produce a user selected area 125, which can be used as a mask to perform an inpainting method. However, the user may inadvertently select areas that they do not want removed from image 100 as part of the user selected area 125. For example, the user may inadvertently select areas of the foreground image element 105. In the illustrated embodiment, user selected area 125 overlaps with a portion of the foreground image element 105 corresponding to the back and neck of the subject.

Figure 1C:
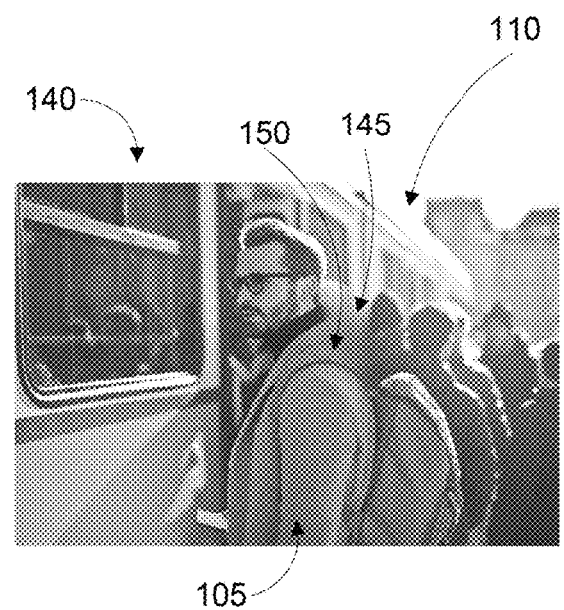

FIG. 1C shows an image 140. Image 140 has the same foreground image element 105 and background image element 110 as image 100. The difference between image 100 and image 140 is that image 140 has had an inpainting process performed on the area selected by the user, that is the user selected area 125. In image 140, the inpainting has been performed by a previously known inpainting technique, using an algorithm to fill the region indicated by user selected area 125 such that the image looks as if the unwanted image element had never been there. For example, this may be done using a machine learning or AI based inpainting method, such as Resolution-robust Large Mask Inpainting with Fourier Convolutions (LaMa), co-modulated Generative Adversarial Networks (CoModGANs), or Guided Language-to-Image Diffusion for Generation and Editing (GLIDE).

In the illustrated example, the inpainting technique has removed unwanted image element 115, but has distorted the foreground image element 105 to produce a distorted foreground portion 150. As shown in the illustrated example, the neck, shoulder and back of the subject who forms foreground image element 105 has been blurred and distorted in the area indicated as distorted foreground portion 150. The technique has also distorted background image element 110 to produce a distorted background portion 145. As shown in the illustrated example, the colour of the distorted background portion 145 does not match the surrounding areas of the background image element 110, as the foreground image element 105 has bled into the background image element 110. These effects may be increased the more that user selected area 125 overlaps foreground image portion 105. The intent of the user would most likely be to leave foreground image element 105 unchanged, and to have a more realistic fill of the background image portion 110.

Figure 2A:
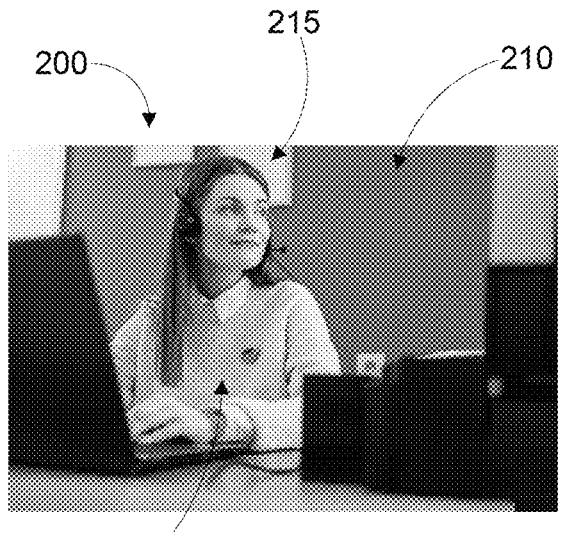
FIGS. 2A to 2D show a second series of example images that show the results of inpainting using prior known techniques compared to methods of some embodiments described below.

FIG. 2A shows another example image 200 having a foreground image element 205 and a background image element 210. In the illustrated example, foreground image element 205 comprises a person located close to the camera capturing the image and being the main subject of the image, while background image element 210 comprises the walls of the room that the person is located in, serving as a backdrop. Image 200 also comprises an unwanted image element 215, being a number of picture frames, which have been partially captured in the image behind the subject of the image. The unwanted image element 215 is directly adjacent to and in contact with the edge of part of the foreground image element 205.

Figure 2B:
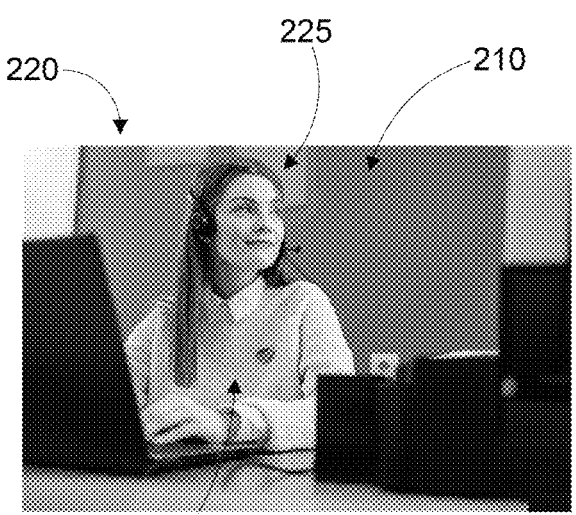

FIG. 2B shows an image 220. Image 220 has the same foreground image element 205 and background image element 210 as image 200. The difference between image 200 and image 220 is that image 220 includes a user selected area 225 applied over unwanted image element 215. According to some embodiments, a user wishing to edit image 200 may interact with a user interface component of a computing device displaying image 200 to indicate which area of image 200 they consider to be an unwanted image element, and wish to remove from the image. For example, the user may use a brush tool, trace tool, or other tool to digitally select, trace, circle, or "paint" over the unwanted image element via the user interface to produce a user selected area 225, which can be used as a mask to perform an inpainting method. However, the user may inadvertently select areas that they do not want removed from image 200 as part of the user selected area 225. For example, the user may inadvertently select areas of the foreground image element 205. In the illustrated embodiment, user selected area 225 overlaps with a portion of the foreground image element 205 corresponding to the hair and face of the subject.

Figure 2C:
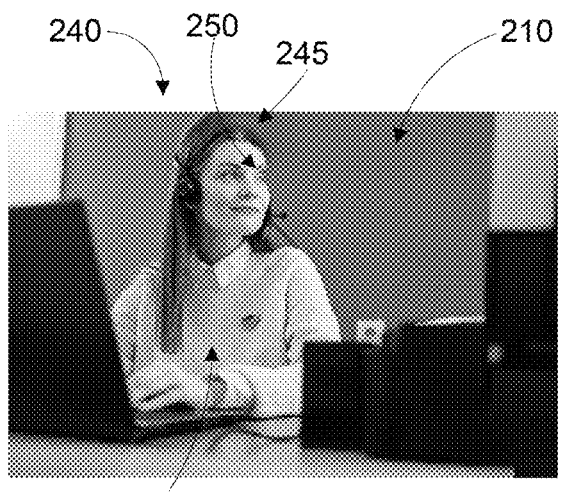

FIG. 2C shows an image 240. Image 240 has the same foreground image element 205 and background image element 210 as image 200. The difference between image 200 and image 240 is that image 240 has had an inpainting process performed on the area of the image selected by user selected area 225. In image 240, the inpainting has been performed by a previously known inpainting technique, using an algorithm to fill the region indicated by user selected area 225 such that the image looks as if the unwanted image element had never been there. For example, this may be done using a machine learning or AI based inpainting method, such as LaMa, CoModGANs or GLIDE.

In the illustrated example, the inpainting technique has removed unwanted image element 215, but has distorted the foreground image element 205 to produce a distorted foreground portion 250. As shown in the illustrated example, the face and hair of the subject who forms foreground image element 205 has been blurred and distorted in the area indicated as distorted foreground portion 250. The technique has also distorted background image element 210 to produce a distorted background portion 245. As shown in the illustrated example, the background image element 210 has blurred and distorted in the area indicated as distorted background portion 245, and the colour of foreground image element 205 has bled into distorted background portion 245. These effects may be increased the more that user selected area 225 overlaps foreground image portion 205. The intent of the user would most likely be to leave foreground image element 205 unchanged, and to have a more realistic fill of the background image portion 210.

The examples shown in FIGS. 1A to 1C and 2A to 2C illustrate some limitations with known methods of inpainting. Where an unwanted image element overlaps, touches, or is proximate to a foreground image element, the area selected by a user for inpainting may touch or overlap the foreground image element, causing undesirable effects. As the user needs to brush or trace close to the foreground image element in order to completely cover or select the unwanted image element, these undesirable effects limit the usability of known inpainting tools.

Figure 1D:
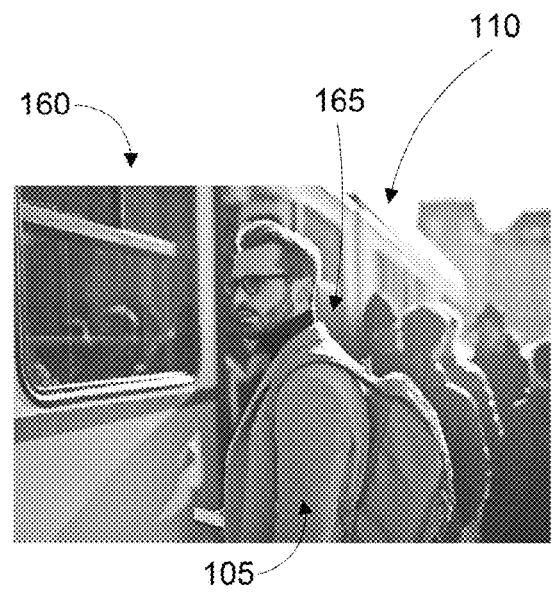
Figure 2D:
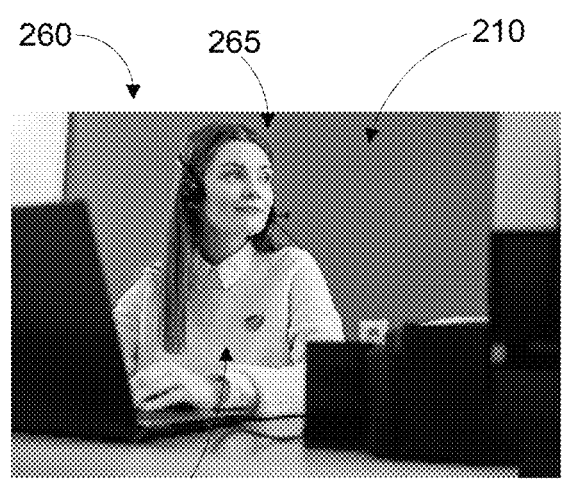

Described embodiments relate to a method of inpainting that preserves background and foreground image elements, to avoid the distortion shown in FIGS. 1C and 2C, even when areas of these image elements are selected. FIGS. 1D and 2D show the results of performing inpainting according to some described embodiments. As seen from these images, the unwanted image elements 115 and 215 have been removed from area 165 and 265, respectively, leaving foreground image elements 105 and 205 and background image elements 110 and 210 undistorted and preserved, producing a more realistic effect compared to the images shown in FIGS. 1C and 2C.

Figure 3:
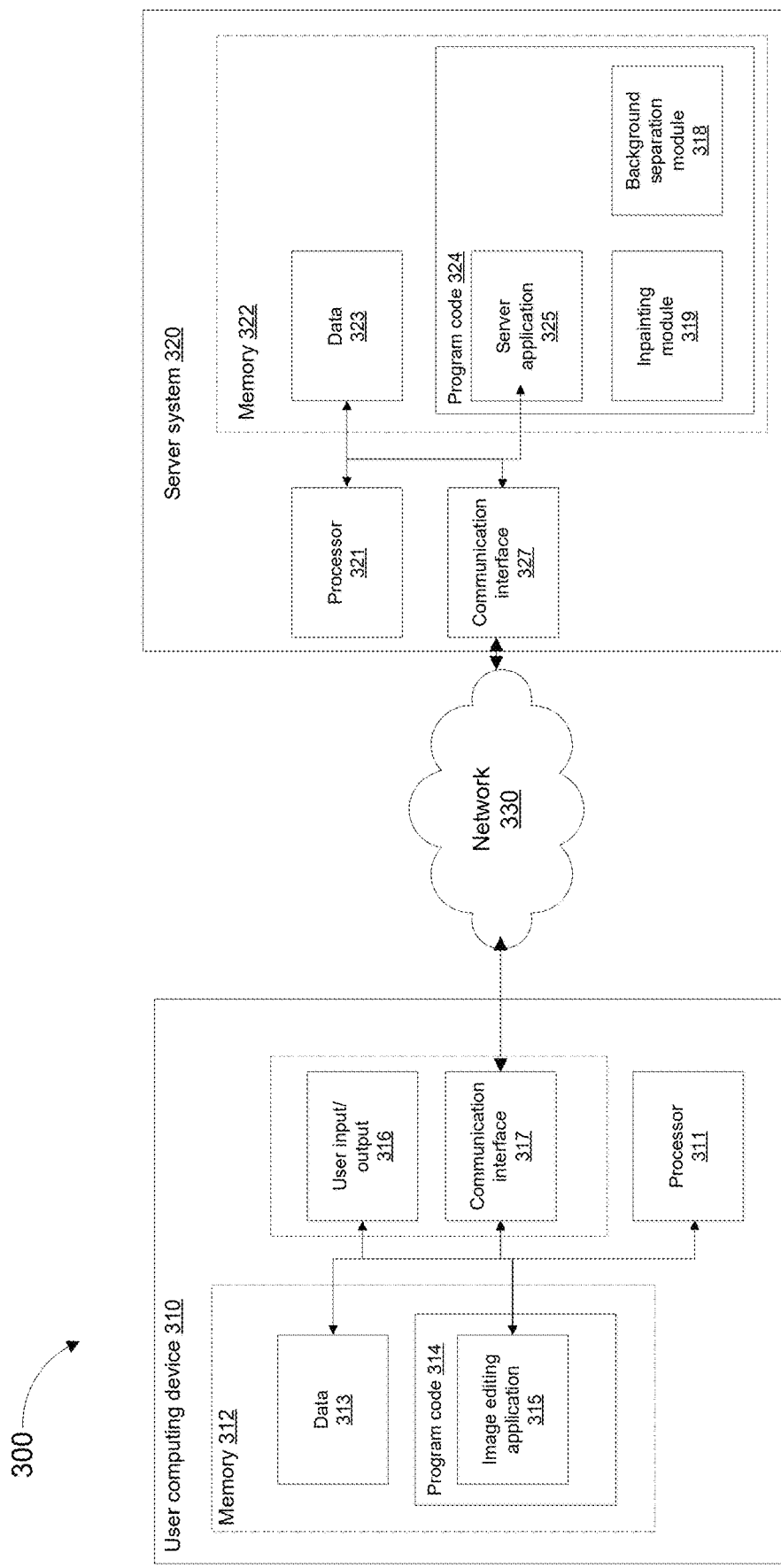
FIG. 3 is a schematic diagram of a system for performing inpainting according to some embodiments.

FIG. 3 is a schematic diagram showing an example system 300 that may be used for performing inpainting methods according to some described embodiments.

System 300 comprises a user computing device 310 which may be used by a user wishing to edit one or more images. Specifically, user computing device 310 may be used by a user to perform inpainting on one or more images using methods as described below. In the illustrated embodiments, system 300 further comprises a server system 320. User computing device 310 may be in communication with server system 320 via a network 330. However, in some embodiments, user computing device 310 may be configured to perform the described methods independently, without access to a network 330 or server system 320.

User computing device 310 may be a computing device such as a personal computer, laptop computer, desktop computer, tablet, or smart phone, for example. User computing device 310 comprises a processor 311 configured to read and execute program code. Processor 311 may include one or more data processors for executing instructions, and may include one or more of a microprocessor, microcontroller-based platform, a suitable integrated circuit, and one or more application-specific integrated circuits (ASIC's).

User computing device 310 further comprises at least one memory 312. Memory 312 may include one or more memory storage locations which may include volatile and non-volatile memory, and may be in the form of ROM, RAM, flash or other memory types. Memory 312 may also comprise system memory, such as a BIOS.

Memory 312 is arranged to be accessible to processor 311, and to store data that can be read and written to by processor 311. Memory 312 may also contain program code 314 that is executable by processor 311, to cause processor 311 to perform various functions. For example, program code 314 may include an image editing application 315. Processor 321 executing image editing application 315 may be caused to perform inpainting methods, as described below in further detail with reference to FIGS. 4 to 13D.

According to some embodiments, image editing application 315 may be a standalone application in the form of a smartphone application or desktop application that provides image editing functionality. In some embodiments, image editing application 315 may be a web browser application (such as Chrome, Safari, Internet Explorer, Opera, or an alternative web browser application) which may be configured to access web pages that provide image editing functionality via an appropriate uniform resource locator (URL).

Program code 314 may include additional applications that are not illustrated in FIG. 3, such as an operating system application, which may be a mobile operating system if user computing device 310 is a mobile device, a desktop operating system if user computing device 310 is a desktop device, or an alternative operating system.

User computing device 310 may further comprise user input and output peripherals 316. These may include one or more of a display screen, touch screen display, mouse, keyboard, speaker, microphone, and camera, for example. User I/O 316 may be used to receive data and instructions from a user, and to communicate information to a user.

User computing device 310 also comprises a communications interface 317, to facilitate communication between user computing device 310 and other remote or external devices. Communications module 317 may allow for wired or wireless communication between user computing device 310 and external devices, and may utilise Wi-Fi, USB, Bluetooth, or other communications protocols. According to some embodiments, communications module 317 may facilitate communication between user computing device 310 and server system 320, for example.

Network 330 may comprise one or more local area networks or wide area networks that facilitate communication between elements of system 300. For example, according to some embodiments, network 330 may be the internet. However, network 330 may comprise at least a portion of any one or more networks having one or more nodes that transmit, receive, forward, generate, buffer, store, route, switch, process, or a combination thereof, etc. one or more messages, packets, signals, some combination thereof, or so forth. Network 330 may include, for example, one or more of: a wireless network, a wired network, an internet, an intranet, a public network, a packet-switched network, a circuit-switched network, an ad hoc network, an infrastructure network, a public-switched telephone network (PSTN), a cable network, a cellular network, a satellite network, a fibre-optic network, or some combination thereof.

Server system 320 may comprise one or more computing devices and/or server devices, such as one or more servers, databases, and/or processing devices in communication over a network, with the computing devices hosting one or more application programs, libraries, APIs or other software elements. The components of server system 300 may provide server-side functionality to one or more client applications, such as image editing application 315. The server-side functionality may include operations such as user account management, login, and content creation functions such as image editing, saving, publishing, and sharing functions. According to some embodiments, server system 320 may comprise a cloud based server system. While a single server system 320 is shown, server system 320 may comprise multiple systems of servers, databases, and/or processing devices. Server system 320 may host one or more components of a platform for performing inpainting according to some described embodiments.

Server system 320 may comprise at least one processor 321 and a memory 322. Processor 321 may include one or more data processors for executing instructions, and may include one or more of a microprocessor, microcontroller-based platform, a suitable integrated circuit, and one or more application-specific integrated circuits (ASIC's). Memory 322 may include one or more memory storage locations, and may be in the form of ROM, RAM, flash or other memory types.

Memory 322 is arranged to be accessible to processor 321, and to contain data 323 that processor 321 is configured to read and write to. Data 323 may store data such as user account data, image data, and data relating to image editing tools, such as machine learning models trained to perform image editing functions.

Memory 322 further comprises program code 324 that is executable by processor 321, to cause processor 321 to execute workflows. For example, program code 324 comprises a server application 325 executable by processor 321 to cause server system 320 to perform server-side functions. According to some embodiments, such as where image editing application 315 is a web browser, server application 325 may comprise a web server such as Apache, IIS, NGINX, GWS, or an alternative web server. In some embodiments, the server application 325 may comprise an application server configured specifically to interact with image editing application 315. Server system 320 may be provided with both web server and application server modules.

Program code 324 may also comprise one or more code modules, such as one or more of a background separation module 318 and an inpainting module 319. As described in further detail below, executing background separation module 318 may cause processor 321 to perform a background separation process, to separate a background and a foreground of an input image. For example, this may be done with a machine learning model, or a pipeline consisting of a combination of machine learning models and traditional image processing techniques. The background separation module may output an alpha channel, as well as color information for the separated foreground elements, in regions where the foreground is not fully opaque. Executing inpainting module 319 may cause processor 321 to perform an inpainting process. For example, processor 321 may be caused to perform a machine learning or AI based inpainting method, such as LaMa, CoModGANs or diffusion models, such as the publicly available Stable Diffusion model. According to some embodiments, processor 321 may be caused to perform an algorithm based inpainting process, such as PatchMatch.

Background separation module 318 and/or inpainting module 319 may be software modules such as add-ons or plug-ins that operate in conjunction with the server application 325 to expand the functionality thereof. In alternative embodiments, modules 318 and/or 319 may be native to the server application 325. In still further alternative embodiments, modules 318 and/or 319 may be stand-alone applications (running on server system 320, or an alternative server system) which communicate with the server application 325.

While modules 318 and 319 have been described and illustrated as being part of/installed at the server system 320, the functionality provided by modules 318 and 319 could alternatively be provided by user computing device 310, for example as an add-on or extension to image editing application 315, a separate, stand-alone server application that communicates with image editing application 315, or a native part of image editing application 315.

Server system 320 also comprises a communications interface 327, to facilitate communication between server system 320 and other remote or external devices. Communications module 327 may allow for wired or wireless communication between server system 320 and external devices, and may utilise Wi-Fi, USB, Bluetooth, or other communications protocols. According to some embodiments, communications module 327 may facilitate communication between server system 320 and user computing device 310, for example.

Server system 320 may include additional functional components to those illustrated and described, such as one or more firewalls (and/or other network security components), load balancers (for managing access to the server application 325), and or other components.

Figure 4:
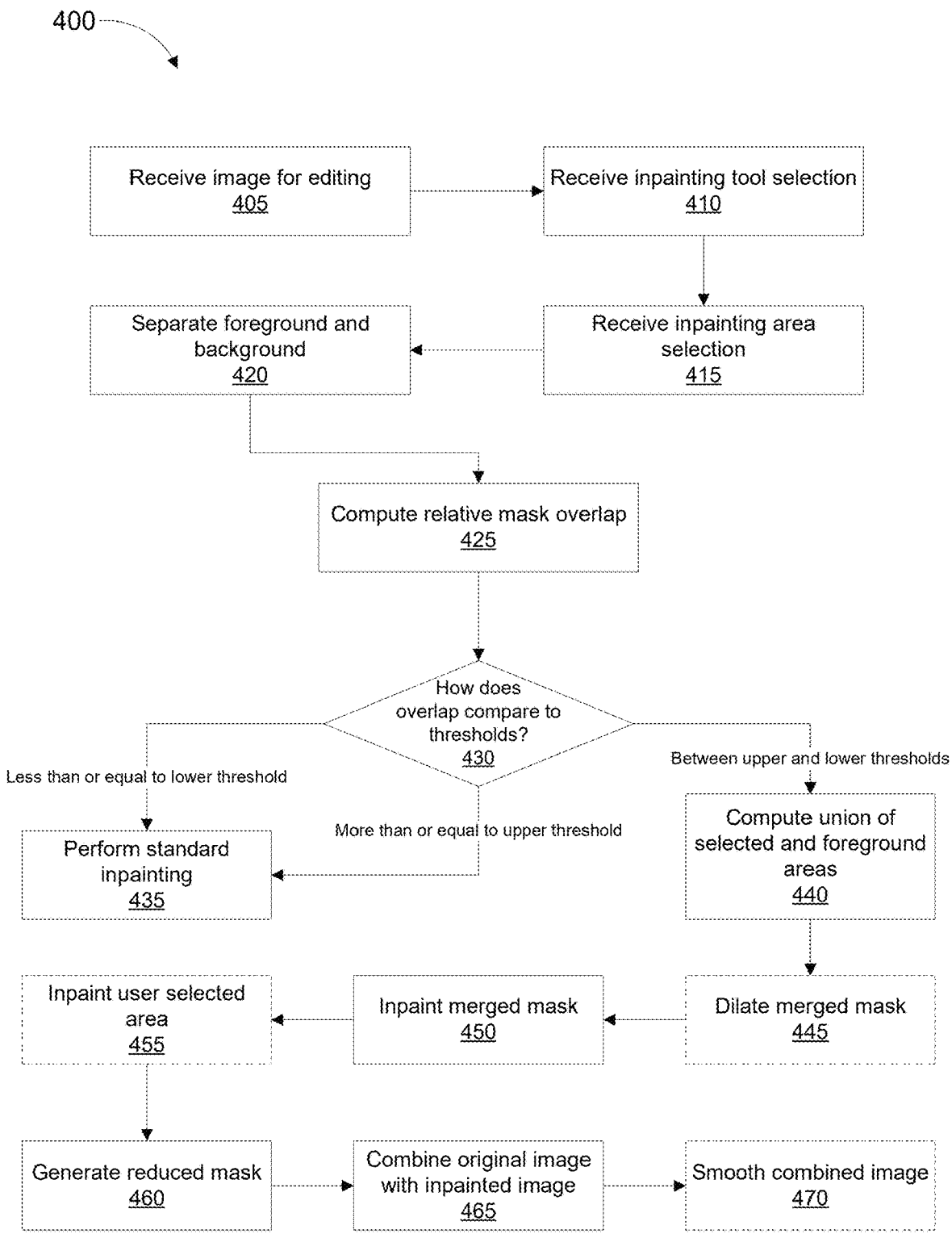
FIG. 4 is a process flow diagram of a method of performing inpainting according to some embodiments.

FIG. 4 is a process flow diagram of a method 400 of performing inpainting according to some embodiments. In some embodiments, method 400 may be performed at least partially by processor 311 executing image editing application 315. In some embodiments, method 400 may be performed at least partially by processor 321 executing server application 325. While certain steps of method 400 have been described as being executed by particular elements of system 300, such as by processor 311 or processor 321, these steps may be performed by different elements in some embodiments.

At step 405, processor 311 executing image editing application 315 receives an image selected by a user for editing. This may be a result of the user using a camera forming part of the User I/O 316 to capture an image for editing, or by the user selecting an image from a memory location. The memory location may be within the data 313 stored in memory 312 locally on user computing device 310, or in the data 323 in memory 322 stored remotely in server system 320. Depending on where the image editing processes are to be performed, a copy of the retrieved image may be stored to a second memory location to allow for efficient access of the image file by processor 311 and/or processor 321. According to some embodiments, the selected image may be displayed within a user interface of the image editing application 315, which may be displayed on a display screen forming part of the user I/O 316. The image editing application 315 may display a number of editing tools for selection by a user to perform image editing functions.

Example images that may be received at step 405 are shown in FIGS. 1A and 2A, as described above, and in FIGS. 5A and 6A, as described in further detail below.

At step 410, processor 311 executing image editing application 315 may receive an indication that an inpainting tool has been selected by a user to perform an inpainting process on the received image. According to some embodiments, the selection of the inpainting tool may cause processor 311 to change a cursor or selection method to a brush style tool, allowing a user to brush or paint over the area or areas of the image that they would like removed. In some embodiments, the selection of the inpainting tool may cause processor 311 to change a cursor or selection method to a trace style tool, allowing a user to trace a perimeter of or circle the area or areas of the image that they would like removed.

At step 415, processor 311 executing image editing application 315 receives user input corresponding to a selection of the area of the image that they would like removed using the selected inpainting tool, referred to as the user selected area.

An example image showing a user selected area that may be received at step 415 is shown in FIGS. 1B and 2B, as described above, and in FIG. 5B, as described in further detail below.

At step 420, processor 311 executing image editing application 315 is caused to process the image to separate the background of the image from the foreground of the image. In some embodiments, processor 311 performs step 420 by communicating the image to be processed to server system 320, and causing processor 321 to execute background separation module 318. According to some embodiments, this may cause processor 321 to perform a background removal process on the image. According to some embodiments, this may cause processor 321 to perform a foreground removal process on the image. Processor 321 may further be caused to generate a foreground mask and/or a background mask based on the outcome of the separation process, in some embodiments.

Figure 5A:
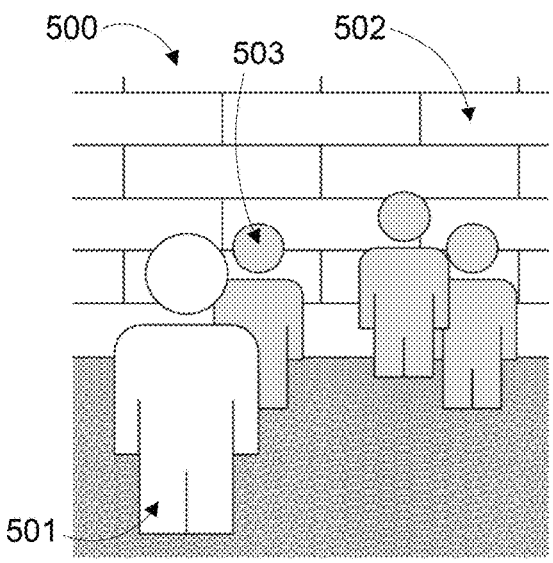
FIGS. 5A to 5K are example diagrams showing the steps of performing the method of FIG. 4 according to some embodiments.
Figure 5B:
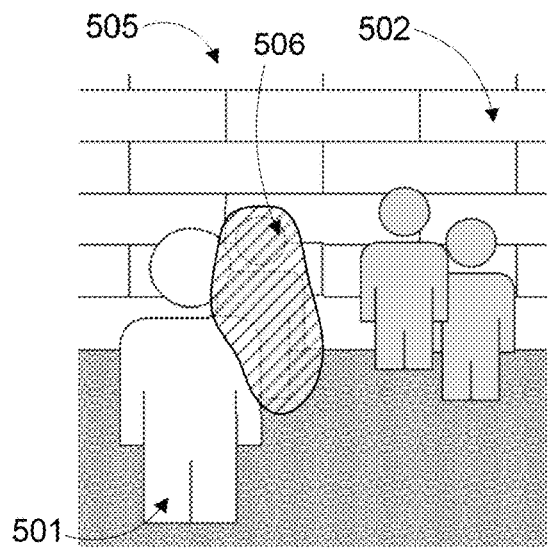
Figure 5C:
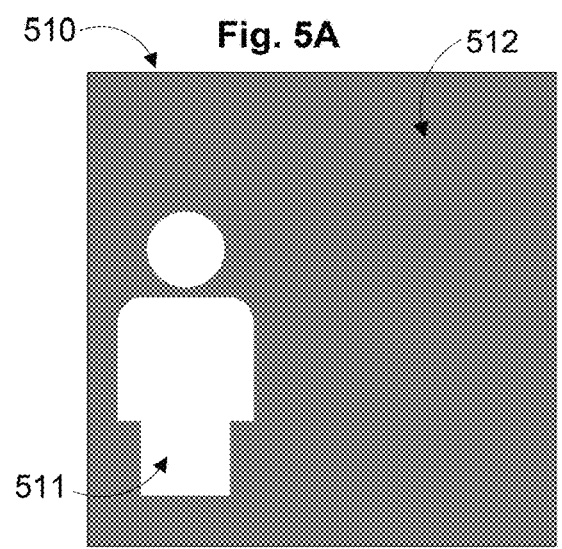
Figure 6C:
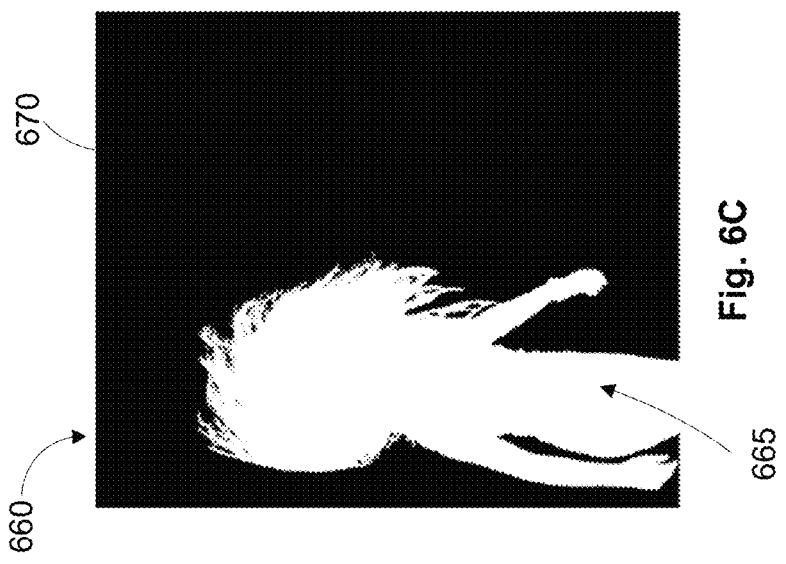
FIGS. 6A to 6C show a series of example images showing the results of performing a background separation step according to some embodiments.
Figure 6B:

An example image having had a background removal process applied is shown in FIG. 6B, as described in further detail below. An example image showing a foreground mask is shown in FIG. 5C and FIG. 6C, as described in further detail below.

At step 425, processor 311 executing image editing application 315 is caused to determine the amount of overlap between the user selected area as received at step 415 and the foreground and/or background as identified at step 420. According to some embodiments, processor 311 may calculate a relative mask overlap (RMO) of the user selected area (US_area) with the foreground area (FG_area) based on the following equation:

$$RMO = \frac{\text{Num\_pixels(US\_area} \cap \text{FG\_area)}}{\text{Num\_pixels(US\_area)}}$$

The numerator of the fraction computes the intersection of the pixels of US_area and FG_area. The denominator computes the number of pixels of US_area. Additionally or alternatively, processor 311 may calculate a relative mask overlap (RMO) of the user selected area (US_area) with the background area (BG_area).

Figure 5D:
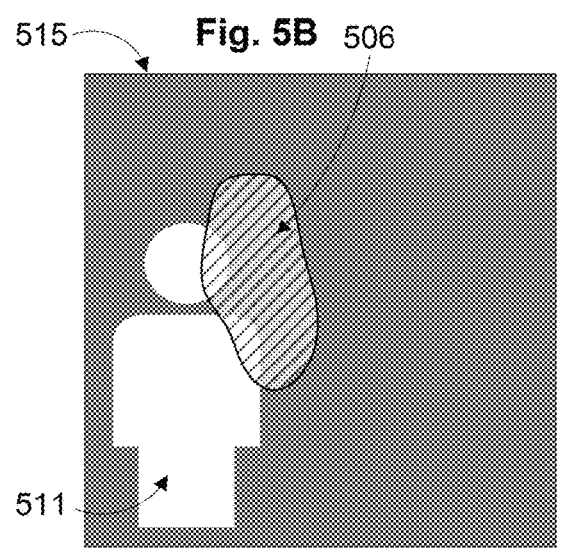

An example image illustrating an overlap between a user selected area and a foreground area is shown in FIGS. 5D and 7D, as described in further detail below.

At step 430, processor 311 executing image editing application 315 is caused to compare the determined value of RMO with one or more threshold values to determine which parts of the image the user intended to inpaint. According to some embodiments, processor 311 may compare the RMO to a lower threshold. The lower threshold may be 0% in some embodiments. According to some embodiments, processor 311 may compare the RMO to an upper threshold. The upper threshold may be between 20% and 90%. In some embodiments, the upper threshold may be between 40% and 60%. For example, the upper threshold may be 50% in some embodiments. In some embodiments, the upper threshold may be calculated by processor 311 based on the size of the user selected area, or the size of the user selected area compared to the accuracy of the selection tool used by the user to select the user selected area. Where the user selected area is small, especially when compared to the tool size, the accuracy of selection is likely to be lower, and the upper threshold value may be selected to be a higher percentage, as it is harder for the user to accurately select a small area of the image for selection. In some embodiments, the threshold values may simply be retrieved from data 313 or data 323.

Where the RMO is less than or equal to the lower threshold, this indicates that the user selected area is wholly in the background area of the image, and that the user intended to remove an area of the background. Processor 311 executing image editing application 315 proceeds to step 435 to perform an inpainting process on the image, which may be performed by processor 311 communicating the image to be inpainted to server system 320, and causing processor 321 to execute inpainting module 319. This may cause processor 321 to perform an inpainting process on the user selected area of the image.

Where the RMO is more than or equal to the upper threshold, this indicated that the user selected area is largely in the foreground area of the image, and that the user intended to remove an area of the foreground. According to some embodiments, processor 311 may determine whether the foreground area is wholly encompassed in the user selected area. If so, the user may be intending to remove the foreground area, and processor 311 executing image editing application 315 may proceed to step 435 to perform or cause server system 320 to perform an inpainting process on the user selected area of the image. Alternatively, where the user selected area is largely on the foreground area but does not cover the whole foreground area, this may indicate that the user intended to inpaint a portion of the foreground area, and processor 311 may proceed to perform or cause server system 320 to perform an inpainting process on only the foreground area, before combining the inpainted foreground area with the original background area.

Where the RMO is more than the lower threshold but less than the upper threshold, this may indicate that the user wanted to remove something in the background area of the image but happened to brush or trace slightly over the foreground area. In this case, processor 311 may activate a foreground protection algorithm as described below with reference to steps 440 to 470.

At step 440, processor 311 executing image editing application 315 is caused to compute a union of the user selected area as received at step 415, and the foreground area as determined at step 420. A new mask is created from the results of this union, referred to as the merged mask.

Figure 5E:
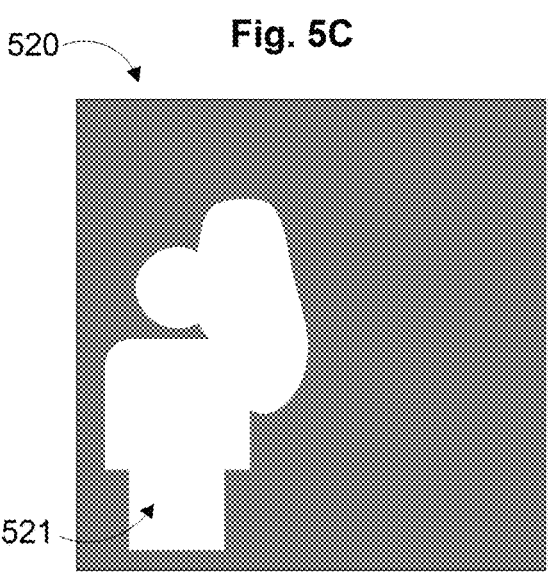
Figures 8A, 8B:
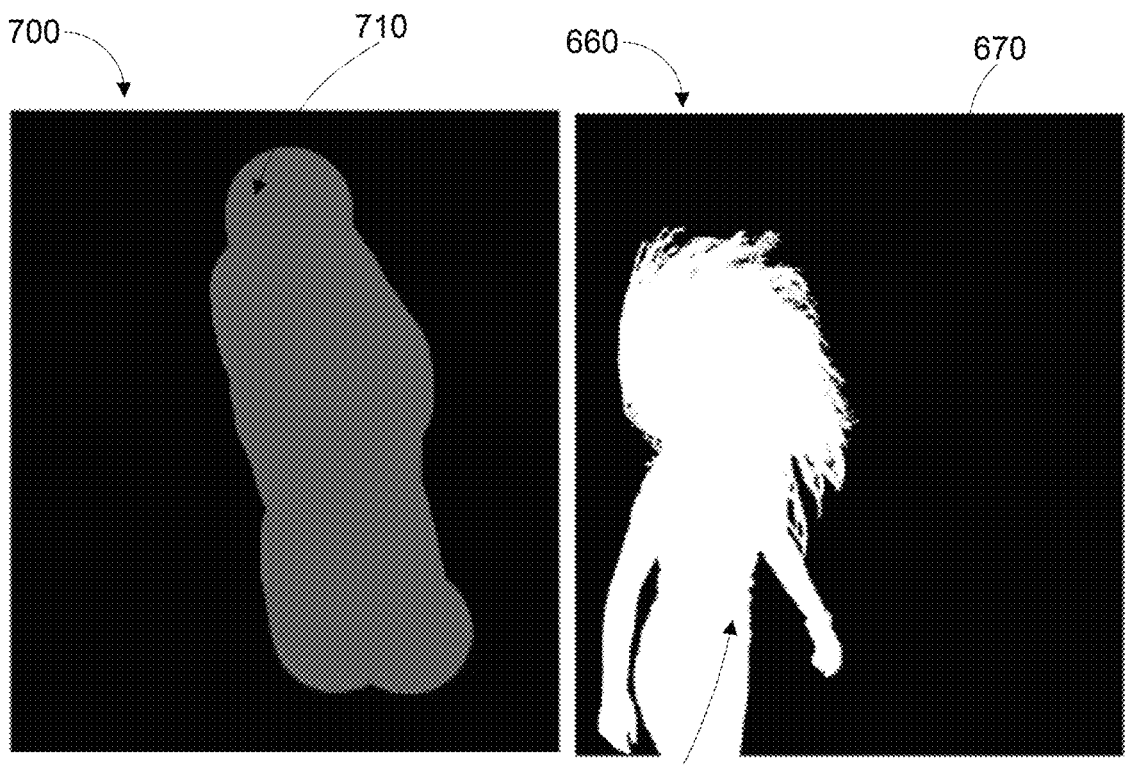
FIGS. 8A to 8D show a series of example images showing the results of performing a merged mask generation step according to some embodiments.
Figures 8C, 8D:
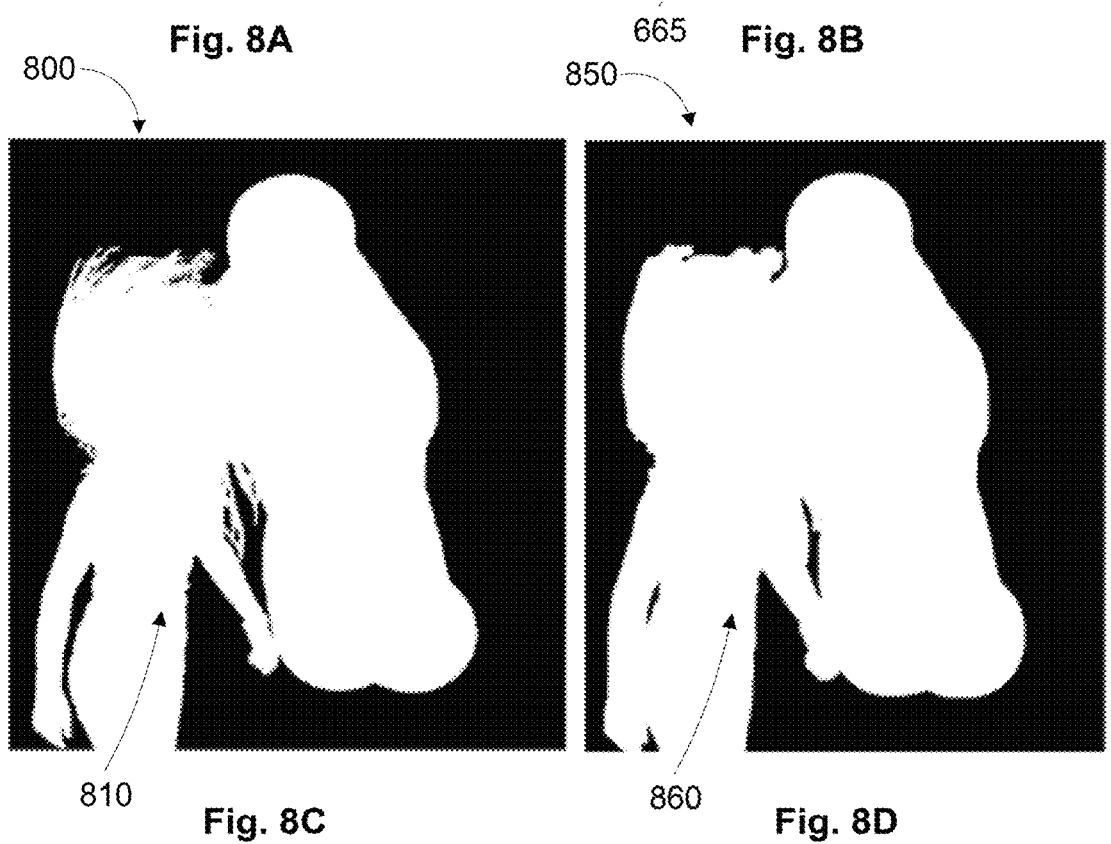

An example image illustrating a union of the user selected area and the foreground area forming a merged mask is shown in FIG. 5E and FIG. 8C, as described in further detail below.

At optional step 445, processor 311 executing image editing application 315 is caused to dilate the merged mask, to ensure any image elements that form part of the foreground area or user selected area have been sufficiently captured. According to some embodiments, the merged mask may be dilated by a predetermined amount, such as a predetermined number of pixels, which may be retrieved from a memory location, such as from data 313 or data 323. For example, the merged mask may be dilated by between 1 and 10 pixels. In some embodiments, the merged mask may be dilated by between 3 and 7 pixels. In some embodiments, the merged mask may be dilated by 5 pixels. In some alternative embodiments, the number of pixels to dilate the image may be calculated based on the size of the image, and may be a percentage of the number of pixels in the image.

Figure 5F:
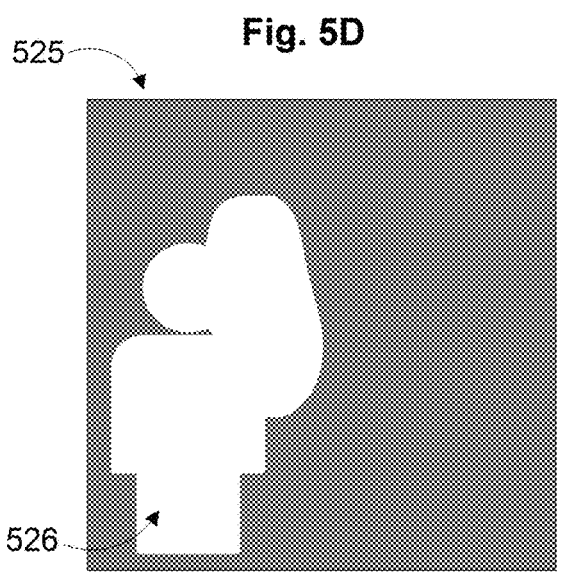

An example image illustrating a dilated merged mask is shown in FIG. 5F and FIG. 8D, as described in further detail below.

At step 450, processor 311 executing image editing application 315 is caused to inpaint the area of the original image as received at step 405 that is spatially aligned with the dilated merged mask determined at step 445 (or the merged mask as determined at step 440). Step 450 may be performed by processor 311 communicating the image to be inpainted to server system 320, and causing processor 321 to execute inpainting module 319. This may cause processor 321 to perform an inpainting process on the masked area. The result is a relatively realistic filling of the masked area. In an ideal case, the image looks realistic and as if the masked area of the image had never been there.

Figure 5G:
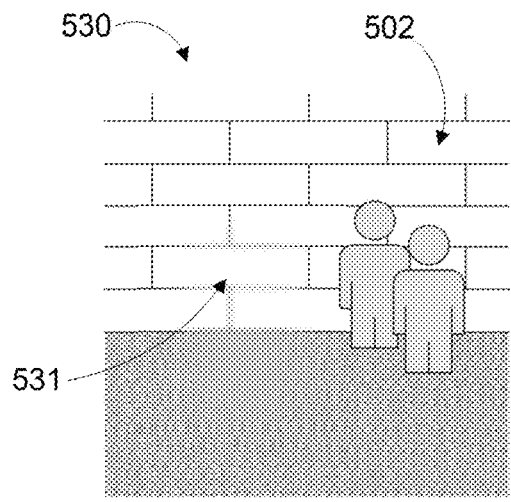
Figure 9A:
FIGS. 9A to 9C show a series of example images showing the results of performing a merged mask inpainting step according to some embodiments.
Figure 9B:
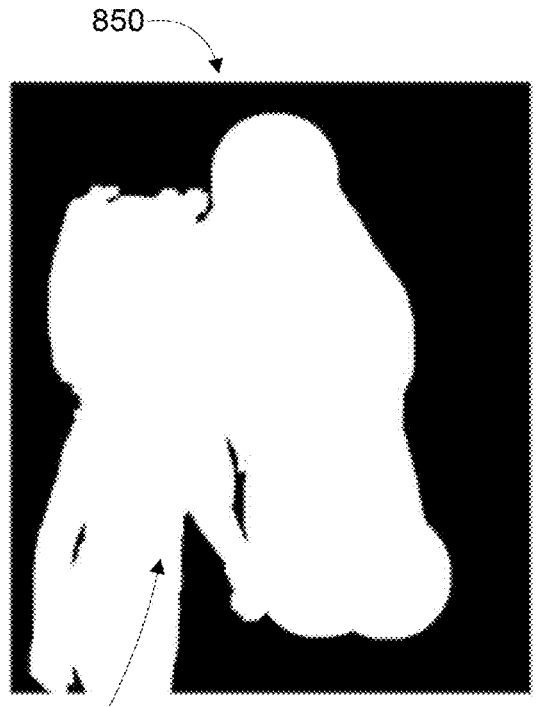
Figure 9C:
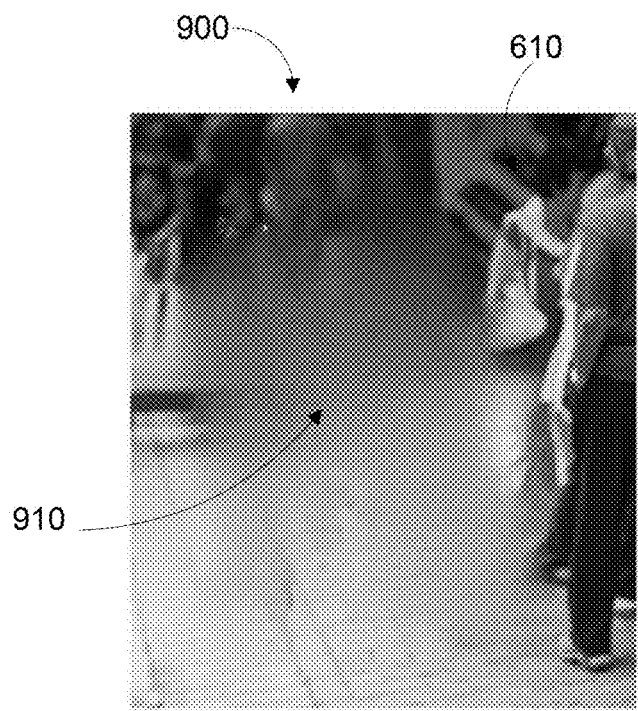

An example image illustrating an inpainting of the merged mask is shown in FIG. 5G and FIG. 9C, as described in further detail below.

At optional step 455, processor 311 executing image editing application 315 is caused to perform a second inpainting step, by inpainting the area of the inpainted image as generated at step 450 that correlates with the user selected area as received at step 415. As the user selected area is the area of the image from which the unwanted image element is being removed, performing step 455 may result in a more high-resolution and realistic fill of that area. This is because inpainting processes often produce more high-resolution and realistic results when the area being inpainted is smaller in size, compared to inpainting a larger area. Step 455 may be performed by processor 311 communicating the image to be inpainted to server system 320, and causing processor 321 to execute inpainting module 319. This may cause processor 321 to perform an inpainting process on the masked area.

At step 460, processor 311 executing image editing application 315 is caused to generate a reduced mask, being the user selected area received at step 415 reduced by the foreground area as calculated at step 420. In other words, the parts of the user selected area that overlap with the foreground area are removed from the user selected area to form the reduced mask.

Figure 5H:
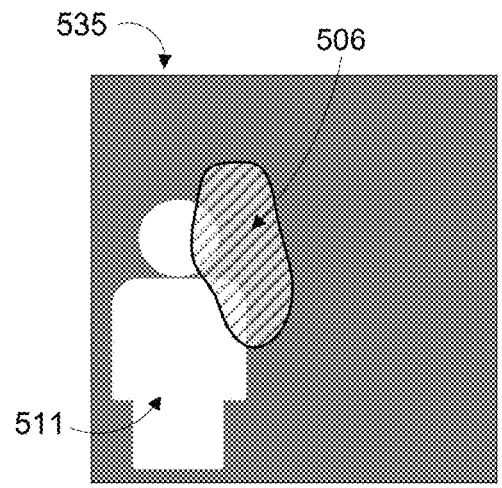
Figure 5I:
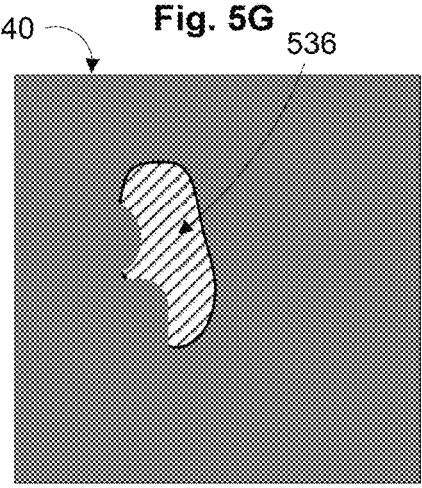
Figure 11A:
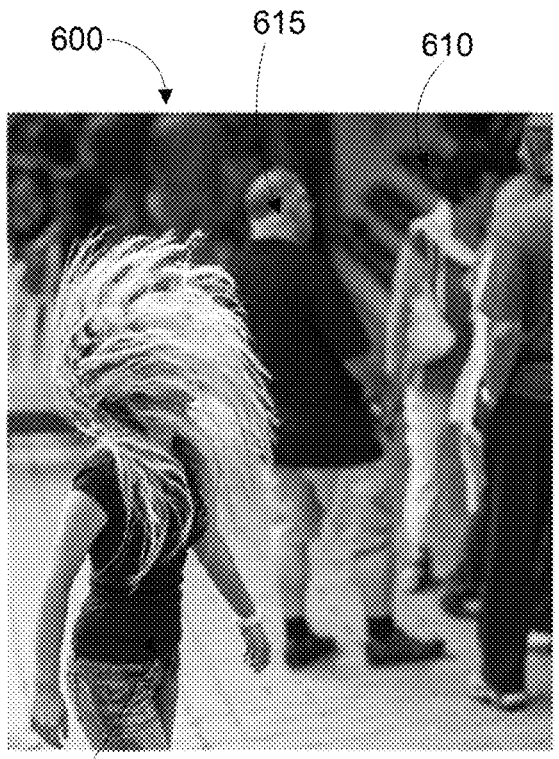
FIGS. 11A to 11D show a series of example images showing the results of performing a reduced mask generation step according to some embodiments.
Figure 11B:
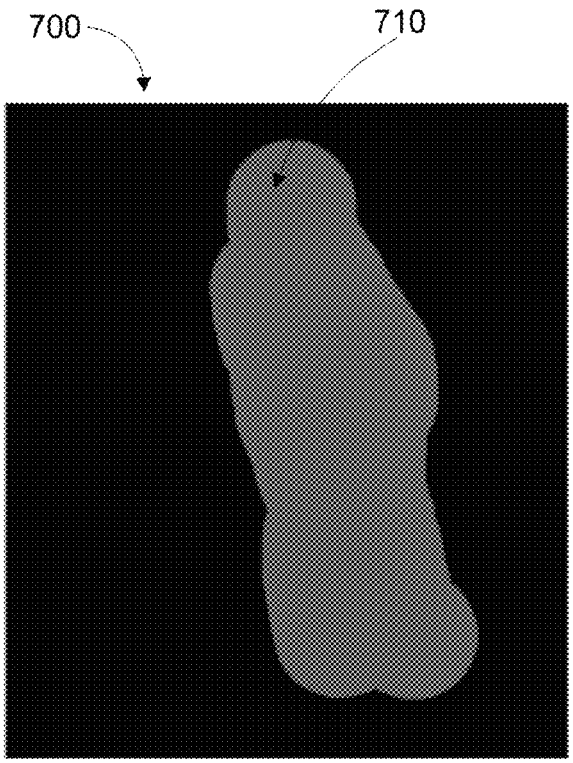
Figure 11C:
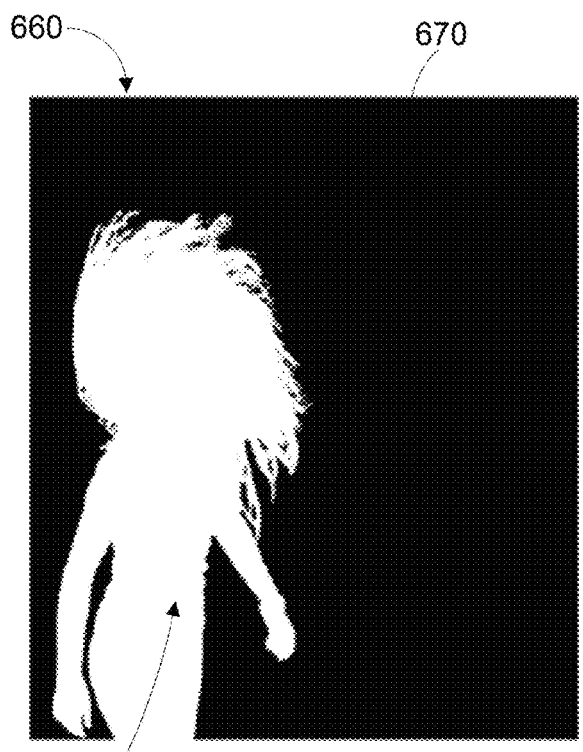
Figure 11D:
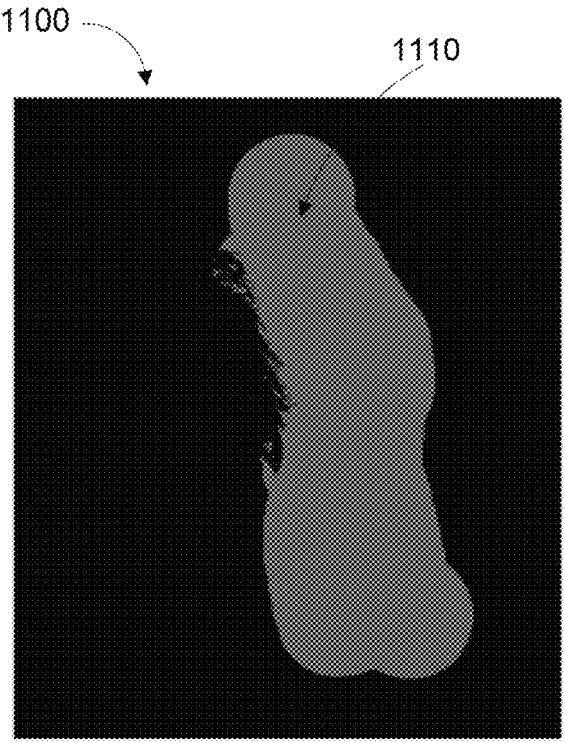

An example image illustrating a reduced mask is shown in FIG. 5I and FIG. 11D, as described in further detail below.

At step 465, processor 311 executing image editing application 315 is caused to combine the original image as received at step 405 with the inpainted image generated at step 450 or 455 using the reduced mask. Specifically, the areas of the original image corresponding to the reduced mask are replaced with the inpainted image. This causes the background areas of the original image that were selected by the user at step 415 to be filled with the inpainted image, while the foreground image remains untouched.

Figure 5J:
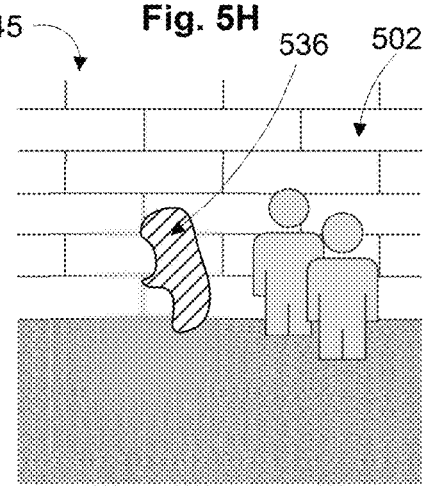
Figure 5K:
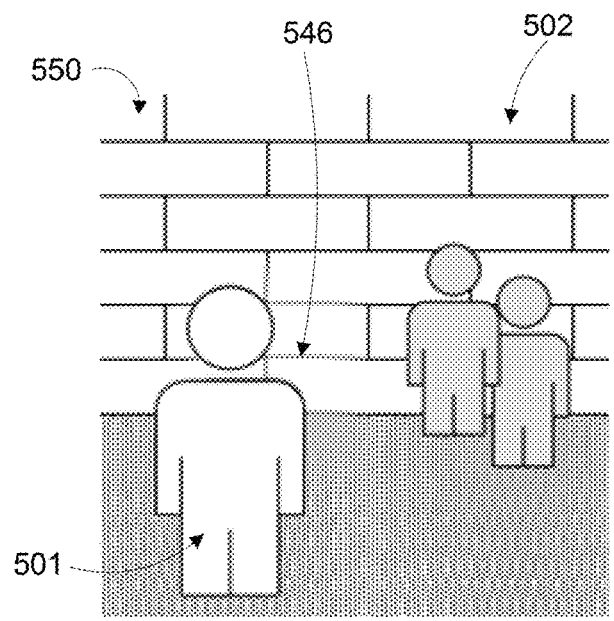
Figure 12A:
FIGS. 12A to 12D show a series of example images showing the results of performing a reduced mask inpainting step according to some embodiments.
Figure 12B:
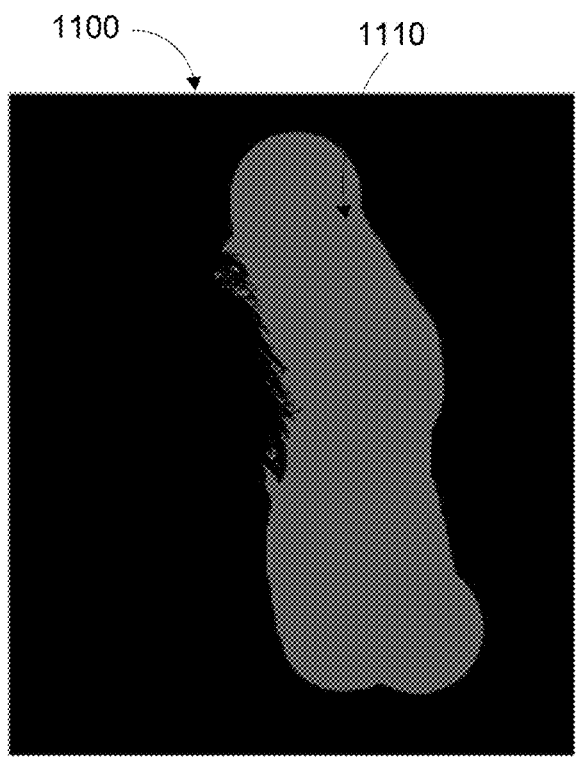
Figure 12C:
Figure 12D:
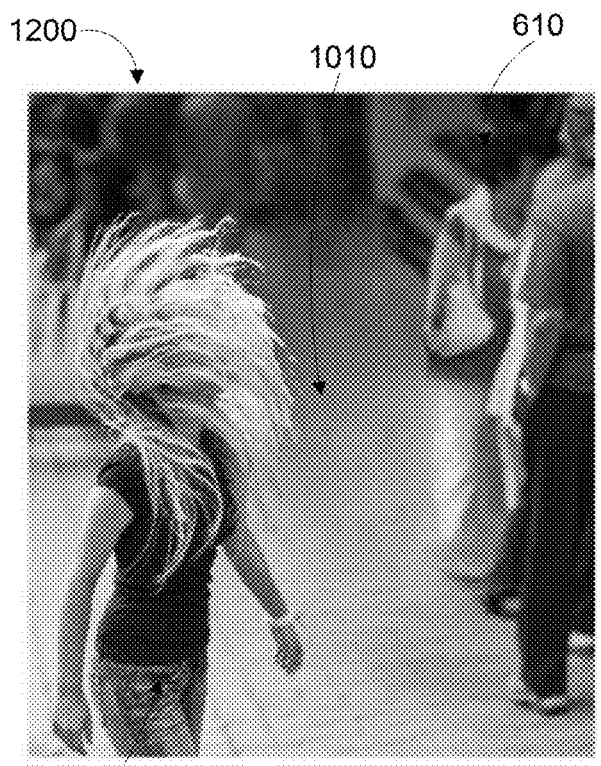

An example image illustrating the combined image is shown in FIG. 5K and FIG. 12D, as described in further detail below.

At optional step 470, processor 311 executing image editing application 315 is caused to perform a smoothing process to the combined image generated at step 465. A more realistic result may be achieved if the transition between the original image and the inpainted image is faded in at the edge of the reduced mask. This may be achieved by performing alpha compositing of the foreground area that overlaps the user selected area, such that a few pixels at the boundary of the mask are taken from the foreground area and added to the combined image as generated at step 465. This may produce a smoother transition. While steps 465 and 470 are illustrated in separate blocks, according to some embodiments, smoothing may be performed at the time the image is combined at step 465, rather than as an additional step 470.

Figure 13A:
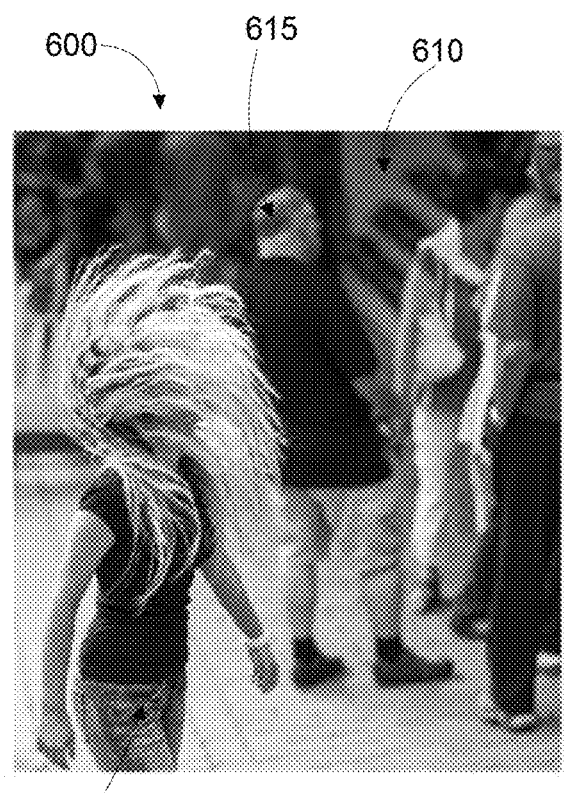
FIGS. 13A to 13D show a series of example images showing the results of performing a smooth image merging step according to some embodiments.
Figure 13B:
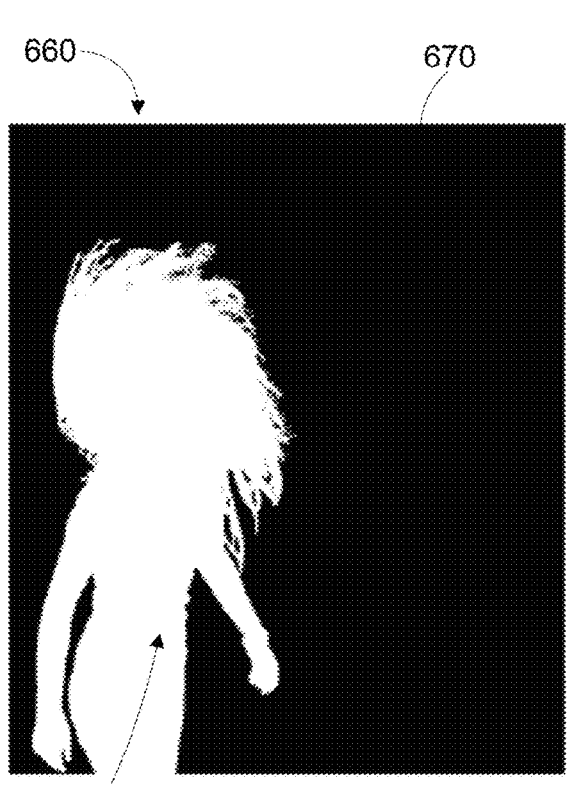
Figure 13C:
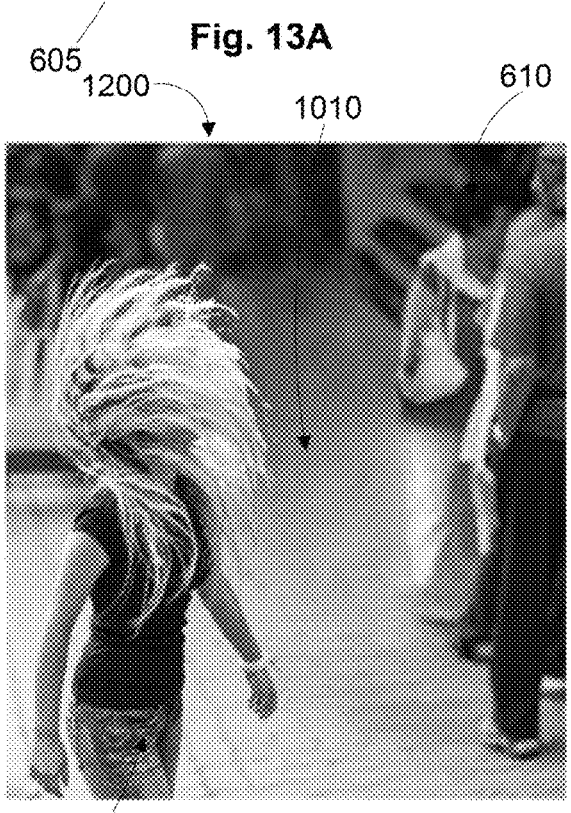
Figure 13D:
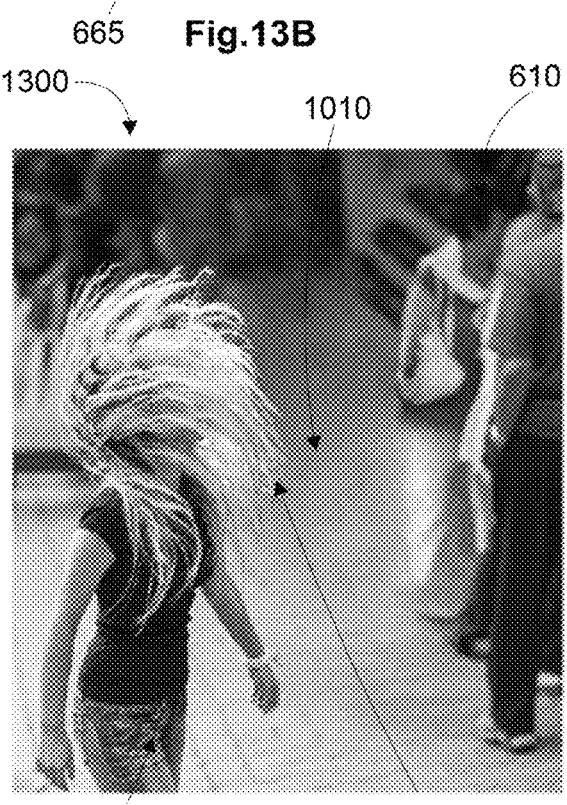

An example image illustrating an alpha compositing between the combined image and the foreground area is shown in FIG. 13D, as described in further detail below.

FIGS. 5A to 5K are diagrammatical representations of the stages of performing method 400 on an image.

FIG. 5A shows an example image 500, which may be an image received by processor 311 executing image editing application 315 at step 405 of method 400, as described above. Image 500 includes a foreground element 501, being a person that is the subject of the captured image, and appears closest to the viewer. Image 500 includes a background element 502, including a brick wall and some other people. Image 500 also includes an unwanted image element 503, being a person who appears behind the foreground element 501 and is not the intended subject of the image.

FIG. 5B shows an example image 505, which may be an image displayed to a user via user I/O 316 after execution of step 415 of method 400, as described above. As step 415, the user selects an area of the original image 500 that they would like removed, which is displayed as user selected area 506, along with the previously displayed elements of image 500 such as foreground element 501 and background element 502. In this case, user selected area 506 overlaps unwanted image element 503. However, user selected area 506 also partially overlaps foreground image element 501.

FIG. 5C shows an example image 510, showing the results of processor 311 executing image editing application 315 performing step 420, as described above. At step 420, a background separation step is performed, such that the original image 500 is separated into a foreground area 511 and a background area 512.

FIG. 5D shows an example image 515, showing the overlap of foreground area 511 with user selected area 506 that may be calculated by processor 311 executing image editing application 315 to perform step 425, as described above. As described in further detail above, at step 425 processor 311 is caused to calculate the overlap between foreground area 511 and user selected area 506, to determine the type of inpainting process to perform on the image 500. With respect to the illustrated embodiment, it is assumed that the amount of overlap is between the lower and upper threshold amount, meaning that the processor 311 determines that a foreground protection algorithm should be performed, as described with respect to steps 440 to 470 above.

FIG. 5E shows an example image 520, showing the results of processor 311 executing image editing application 315 to perform step 440, as described above. At step 440, processor 311 generates a merged mask 521, being the union of foreground area 511 and user selected area 506, as shown in FIG. 5D.

FIG. 5F shows an example image 525, showing the results of processor 311 executing image editing application 315 to perform step 445, as described above. At step 445, processor 311 generates a dilated merged mask 526, by enlarging or dilating the merged mask as shown in FIG. 5E.

FIG. 5G shows an example image 530, showing the results of processor 311 executing image editing application 315 to perform step 450, as described above. At step 450, processor 311 inpaints the original image 500 in the area indicated by dilated merged mask 526. The resulting image 530 includes the background element 502 as in the original image 500. However, the foreground element 501 and the unwanted image element 503 have been inpainted to produce inpainted area 531. In other words, foreground element 501 and the unwanted image element 503 have been replaced or filled with background imagery generated by processor 311, to create a realistic image that causes the impression that foreground element 501 and the unwanted image element 503 were never in the image.

FIG. 5H shows an example image 535, showing the intersection between foreground area 511 and user selected area 506, which may be used by processor 311 executing image editing application 315 to perform step 460, as described above. At step 460, processor 311 generates a reduced mask, being the user selected area 506 reduced by the foreground area 511.

FIG. 5I shows an example image 540, showing the results of processor 311 executing image editing application 315 to perform step 460, as described above. At step 460, processor 311 generates a reduced mask 536, by subtracting the foreground area 511 from the user selected area 506 as shown in FIG. 5H.

FIG. 5J shows an example image 545, showing the reduced mask 536 overlaid on the inpainted image 530, which may be used by processor 311 executing image editing application 315 to perform step 465, as described above. At step 465, processor 311 combines original image 500 with the inpainted image 530 in the area defined by reduced mask 536. In some embodiments, this may be done by copying the area of image 540 that overlaps with reduced mask 536, and pasting this onto the same area of the original image 500.

FIG. 5K shows an example image 550, showing the results of processor 311 executing image editing application 315 to perform step 465, as described above. At step 465, processor 311 combined original image 500 with inpainted image 530 to produce a final image 545, where the unwanted image element 503 has been removed to produce inpainted area 546, while preserving foreground element 501.

Figure 6A:

FIGS. 6A to 6C show a series of example images showing the results of processor 311 executing image editing application 315 to perform step 420, being a background separation step, as described above.

FIG. 6A shows an example image 600, which may be an image received by processor 311 executing image editing application 315 at step 405 of method 400, as described above. Image 600 includes a foreground element 605, being a person that is the subject of the captured image, and appears closest to the viewer. Image 600 includes a background element 610, including a floor and other people. Image 600 also includes an unwanted image element 615, being a person who appears behind the foreground element 605 and is not the intended subject of the image.

FIG. 6B shows an example image 630 illustrating the results of processor 311 executing image editing application 315 to perform a background removal step on image 600, which may be done by processor 311 communicating the image to be processed to server system 320, and causing processor 321 to execute background separation module 318. In image 630, foreground element 605 has been retained, but background element 610 including unwanted image element 615 has been removed, leaving just a background area 635.

FIG. 6C shows an example image 660 illustrating the results of processor 311 executing image editing application 315 to perform a foreground removal step on image 630, which may be done by processor 311 communicating the image to be processed to server system 320, and causing processor 321 to execute background separation module 318. In image 660, foreground element 605 has been removed, leaving just a foreground area 665 and a background area 670. Foreground area 665 and background area 670 may be used as masks by processor 311 in further processing steps.

FIGS. 7A to 7D show a series of example images showing the results of processor 311 executing image editing application 315 to perform step 425, being a relative mask overlap calculation step, as described above.

FIG. 7A shows the original image 600, as described above.

FIG. 7B shows an example image 700 having a user selected area 710 which was selected by a user of user computing device 310 as an area of the original image 600 that they would like removed. The user selected area 710 corresponds with the unwanted image element 615. However, user selected area 710 also overlaps foreground element 605.

FIG. 7C shows an example image 660 separated into a foreground area 665 and a background area 670, as described above.

FIG. 7D shows an image 750 showing the user selected area 710 of FIG. 7B overlaid on the foreground area 665 of FIG. 7C. This image may be used by processor 311 to perform step 425, to determine the amount of overlap 760 between user selected area 710 and foreground area 665.

FIGS. 8A to 8D show a series of example images showing the results of processor 311 executing image editing application 315 to perform steps 440 and 445, being a merged mask generation step and a dilated merged mask generation step, as described above.

FIG. 8A shows image 700 illustrating the user selected area 710, as described above.

FIG. 8B shows the separated image 660 separated into a foreground area 665 and a background area 670, as described above.

FIG. 8C shows an image 800 illustrating a merged mask 810 generated by processor 311 executing image editing application 315 to perform step 440, as described above. At step 440, processor 311 calculates the union of the user selected area 710 as shown in FIG. 8A and the foreground area 665 as shown in FIG. 8B to produce merged mask 810.

FIG. 8D shows an image 850 illustrating a dilated merged mask 860 generated by processor 311 executing image editing application 315 to perform step 440, as described above. At step 445, processor 311 dilates the merged mask 810 as shown in FIG. 8C to produce dilated merged mask 860.

FIGS. 9A to 9C show a series of example images showing the results of processor 311 executing image editing application 315 to perform step 450, being a merged mask inpainting step, as described above.

FIG. 9A shows the original image 600, as described above.

FIG. 9B shows image 850 illustrating a dilated merged mask 860, as described above.

FIG. 9C shows an image 900 generated by processor 311 executing image editing application 315 to perform step 450, as described above. At step 450, processor 311 performs inpainting of image 600 as shown in FIG. 9A in the area indicated by the dilated merged mask 860 as shown in FIG. 9B. This produces inpainted image 900, in which the foreground element 605 and unwanted image element 615 have been inpainted to produce an inpainted area 910. Background element 610 is otherwise untouched.

FIGS. 10A to 10C show a series of example images showing the results of processor 311 executing image editing application 315 to perform step 455, being a user selected mask inpainting step, as described above.

FIG. 10A shows the inpainted image 900, as described above.

FIG. 10B shows image 700 illustrating user selected area 710, as described above.

FIG. 10C shows an image 1000 generated by processor 311 executing image editing application 315 to perform step 455, as described above. At step 455, processor 311 performs inpainting of image 900 as shown in FIG. 10A in the area indicated by user selected area 710 as shown in FIG. 10B. This produces a further inpainted image 1000, in which the area corresponding to user selected area 710 has been inpainted again to produce a further inpainted area 1010. As described above, this second inpainting step may produce a more high resolution and/or realistic result in the area of the image corresponding to the user selected area 710.

FIGS. 11A to 11D show a series of example images showing the results of processor 311 executing image editing application 315 to perform step 460, being a reduced mask generation step, as described above.

FIG. 11A shows the original image 600, as described above.

FIG. 11B shows image 700 illustrating user selected area 710, as described above.

FIG. 11C shows the separated image 660 separated into a foreground area 665 and a background area 670, as described above.

FIG. 11D shows an image 1100 generated by processor 311 executing image editing application 315 to perform step 460, as described above. At step 460, processor 311 generates a reduced mask 1110 by subtracting foreground area 665 as shown in FIG. 11C from user selected area 710 as show in FIG. 11B.

FIGS. 12A to 12D show a series of example images showing the results of processor 311 executing image editing application 315 to perform step 465, being a reduced mask inpainting step, as described above.

FIG. 12A shows the original image 600, as described above.

FIG. 12B shows image 1100 illustrating the reduced mask 1110, as described above.

FIG. 12C shows the inpainted image 1000, as described above.

FIG. 12D shows an image 1200 generated by processor 311 executing image editing application 315 to perform step 465, as described above. At step 465, processor 311 combines the original image 600 as shown in FIG. 12A with the inpainted image 1000 as shown in FIG. 12C using the reduced mask 1110 as shown in FIG. 12B. Specifically, the area of the original image 600 corresponding to the user selected area 710 is replaced by the corresponding area of inpainted image 1000. Resulting image 1200 includes the background element 610 and foreground element 605 of image 600, but unwanted image element 615 has been replaced by inpainted area 1010 from image 1000.

FIGS. 13A to 13D show a series of example images showing the results of processor 311 executing image editing application 315 to perform step 470, being a smooth image merging step, as described above.

FIG. 13A shows the original image 600, as described above.

FIG. 13B shows the separated image 660 separated into a foreground area 665 and a background area 670, as described above.

FIG. 13C shows the combined image 1200, as described above.

FIG. 13D shows an image 1300 generated by processor 311 executing image editing application 315 to perform step 470, as described above. At step 470, processor 311 performs a smoothing process on the combined image 1200 as shown in FIG. 13C by executing an alpha compositing of the foreground element 605 of FIG. 13A that overlaps with user selected area 710. By adding pixels from foreground element 605 of FIG. 13A to combined image 13C in a graduating manner as the image transitions from foreground area 665 and background area 670, a smoother and more realistic image can be produced. Resulting image 1300 has a smoother and more realistic transition 1305 between foreground element 605 and inpainted area 1010. As described above with reference to FIG. 4, the smoothing process performed at 470 may be performed simultaneously with the process of combining the original image 600 with the inpainted image 1000. As a result, when the smoothing process is performed, image 1300 may be generated directly by combining original image 600 with the inpainted image 1000 using an alpha compositing process, instead of first generating image 1200.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method for performing inpainting, the method comprising:
   accessing a first image;
   receiving a selected area of the first image;
   identifying a foreground area of the first image;
   generating a merged mask that covers the entirety of a union of the selected area and the foreground area;
   performing an inpainting process on an area of the first image corresponding to the merged mask to generate a second image, being an inpainted image;
   generating a reduced mask based on the selected area of the first image reduced by the foreground area of the first image; and
   combining the first image with an area of the second image corresponding to the reduced mask to produce an output image, wherein areas of the first image corresponding to the reduced mask are replaced with the inpainted image.

2. The method of claim 1, further comprising storing the output image to a memory location and/or communicating the output image to an external device.

3. The method of claim 1, further comprising:
   computing a relative mask overlap between the selected area and the foreground area;
   comparing the relative mask overlap with at least one threshold; and
   proceeding with the steps of generating a merged mask, performing an inpainting process, generating a reduced mask and combining images based on results of the comparison, wherein these steps form part of a foreground protection process.

4. The method of claim 3, wherein the relative mask overlap is calculated using the equation:

$$RMO = \frac{\text{Num\_pixels}(US\_area \cap FG\_area)}{\text{Num\_pixels}(US\_area)}$$

where RMO is the relative mask overlap, Num_pixels is a function to find a number of pixels, US_area is the selected area and FG_area is the foreground area.

5. The method of claim 3, wherein comparing the relative mask overlap with at least one threshold comprises comparing the relative mask overlap with a lower threshold, and performing the foreground protection process based on determining that the relative mask overlap is greater than the lower threshold.

6. The method of claim 5, wherein the lower threshold is 0%.

7. The method of claim 5, wherein based on determining that the relative mask overlap is less than or equal to the lower threshold, instead of performing the foreground protection process, performing an inpainting process on the area of the first image corresponding to the selected area to generate the output image.

8. The method of claim 3, wherein comparing the relative mask overlap with at least one threshold comprises comparing the relative mask overlap with an upper threshold, and performing the foreground protection process based on determining that the relative mask overlap is less than the upper threshold.

9. The method of claim 8, wherein the upper threshold is:
   between 10% and 90%; or
   between 40% and 70%; or
   50%.

10. The method of claim 8, wherein based on determining that the relative mask overlap is more than or equal to the upper threshold, instead of performing the foreground protection process, performing an inpainting process on the area of the first image corresponding to the selected area to generate the output image.

11. The method of claim 1, further comprising the step of dilating the merged mask, and performing the inpainting process on the area of the first image corresponding to the dilated merged mask.

12. The method of claim 11, wherein the merged mask is dilated by:
   between 1 and 9 pixels; or
   between 3 and 7 pixels; or
   5 pixels.

13. The method of claim 1, further comprising performing a second inpainting process on the area of the first image corresponding to the selected area to generate the second image.

14. The method of claim 1, further comprising performing a smoothing process on the output image before outputting the image, to smooth the edge between the first image and the second image.

15. The method of claim 14, wherein the smoothing is performed using an alpha compositing process.

16. The method of claim 1, wherein performing the inpainting process comprises performing an AI based inpainting process.

17. The method of claim 16, wherein performing the inpainting process comprises performing a LaMa inpainting process.

18. The method of claim 1, wherein identifying a foreground area of the first image comprises performing a background removal process on the first image.

19. Non-transitory computer-readable storage medium storing instructions which, when executed by a processing device, cause the processing device to perform a method comprising:
   accessing a first image;
   receiving a selected area of the first image;
   identifying a foreground area of the first image;
   generating a merged mask that covers the entirety of a union of the selected area and the foreground area;
   performing an inpainting process on an area of the first image corresponding to the merged mask to generate a second image, being an inpainted image;
   generating a reduced mask based on the selected area of the first image reduced by the foreground area of the first image; and
   combining the first image with an area of the second image corresponding to the reduced mask to produce an output image, wherein areas of the first image corresponding to the reduced mask are replaced with the inpainted image.

20. A computing device comprising:
   the non-transitory computer-readable storage medium of claim 19; and
   a processor configured to execute the instructions stored in the non-transitory computer-readable storage medium.

* * * * *